United States Patent [19]

Payne

[11] Patent Number: 5,554,248

[45] Date of Patent: Sep. 10, 1996

[54] METHOD FOR MANUFACTURING A LIVESTOCK FEEDER

[76] Inventor: Joe L. Payne, Rte. 2, Box 162, Kaw, Okla. 74641

[21] Appl. No.: 308,183

[22] Filed: Sep. 19, 1994

Related U.S. Application Data

[63] Continuation-in-part of Ser. No. 170,489, Dec. 20, 1993.

[51] Int. Cl.$^6$ .......................... B32B 31/00; B29C 65/00
[52] U.S. Cl. ............... 156/304.2; 156/258; 156/304.5; 156/304.6; 119/51.01; 264/503
[58] Field of Search .................. 156/252, 253, 156/258, 304.1, 304.2, 304.5, 304.6, 503; 119/51.01; D30/121, 133; 264/503

[56] References Cited

U.S. PATENT DOCUMENTS

| | | | |
|---|---|---|---|
| 1,203,865 | 11/1916 | Fair | 119/51.01 |
| 3,013,925 | 12/1961 | Larsen | 156/304.5 X |
| 3,906,903 | 11/1975 | Vandewater | D30/121 X |
| 4,075,268 | 2/1978 | Nolan | 156/258 X |
| 4,324,202 | 4/1982 | Stonestreet et al. | 119/51 R |
| 4,401,497 | 8/1983 | Warthmann | 156/304.5 X |
| 5,073,226 | 12/1991 | Suzuki et al. | 156/304.2 X |

OTHER PUBLICATIONS

Warner's Specification, No. 711, Feb. 18, 1880.

*Primary Examiner*—David A. Simmons
*Assistant Examiner*—Paul M. Rivard
*Attorney, Agent, or Firm*—Dunlap & Codding, P.C.

[57] ABSTRACT

A method for manufacturing a livestock feeder for retaining hay so that livestock can consume the hay without trampling thereon is disclosed which includes forming a plurality of leg members and a plurality of retainer members connectable to the leg members. The retainer members are fabricated of a polymeric material having angular deflection characteristics and memory so that the retainer members can be angularly deflected by pressures exerted thereon and restored to a substantially non-deflected position when such pressures are removed.

43 Claims, 14 Drawing Sheets

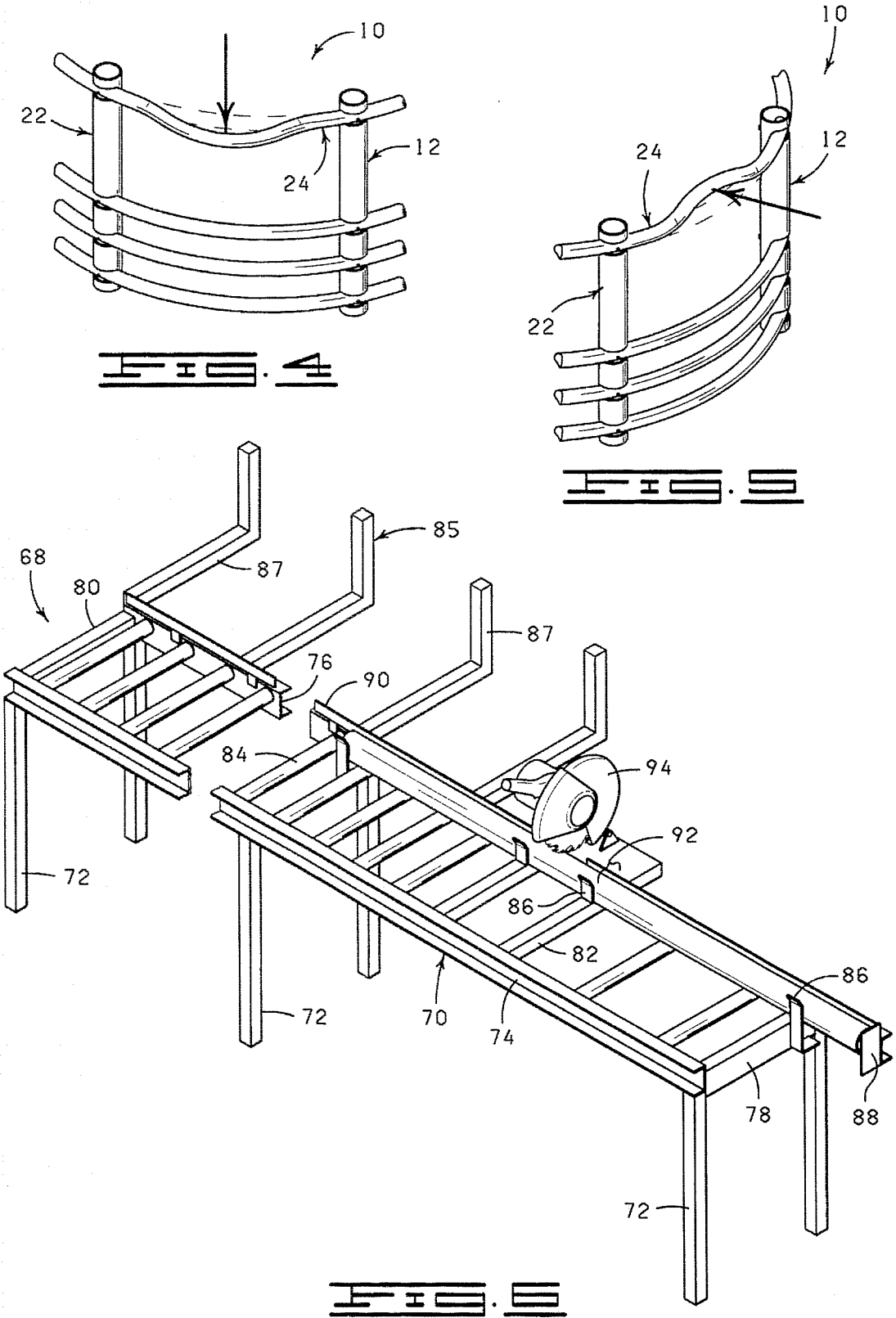

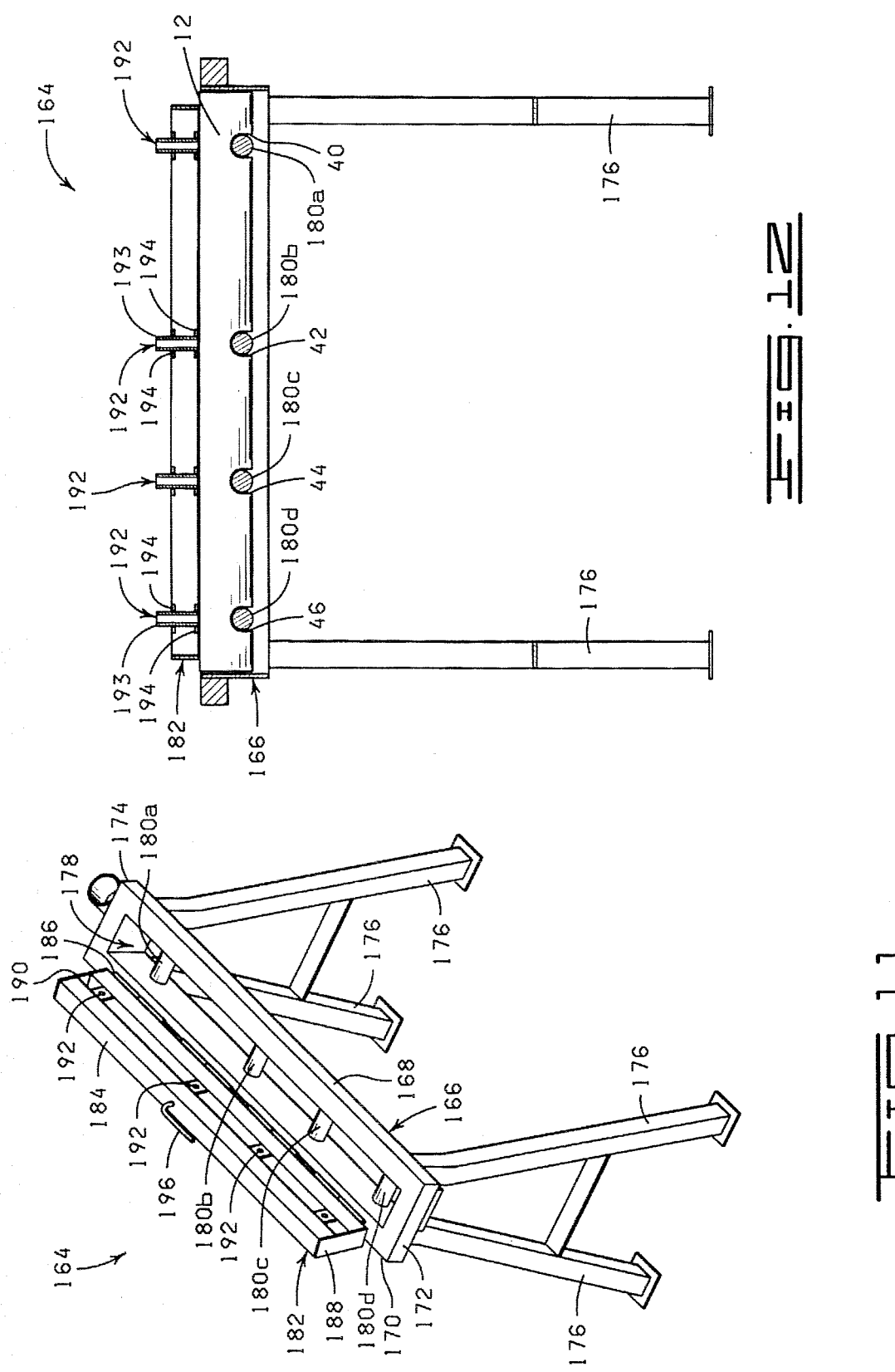

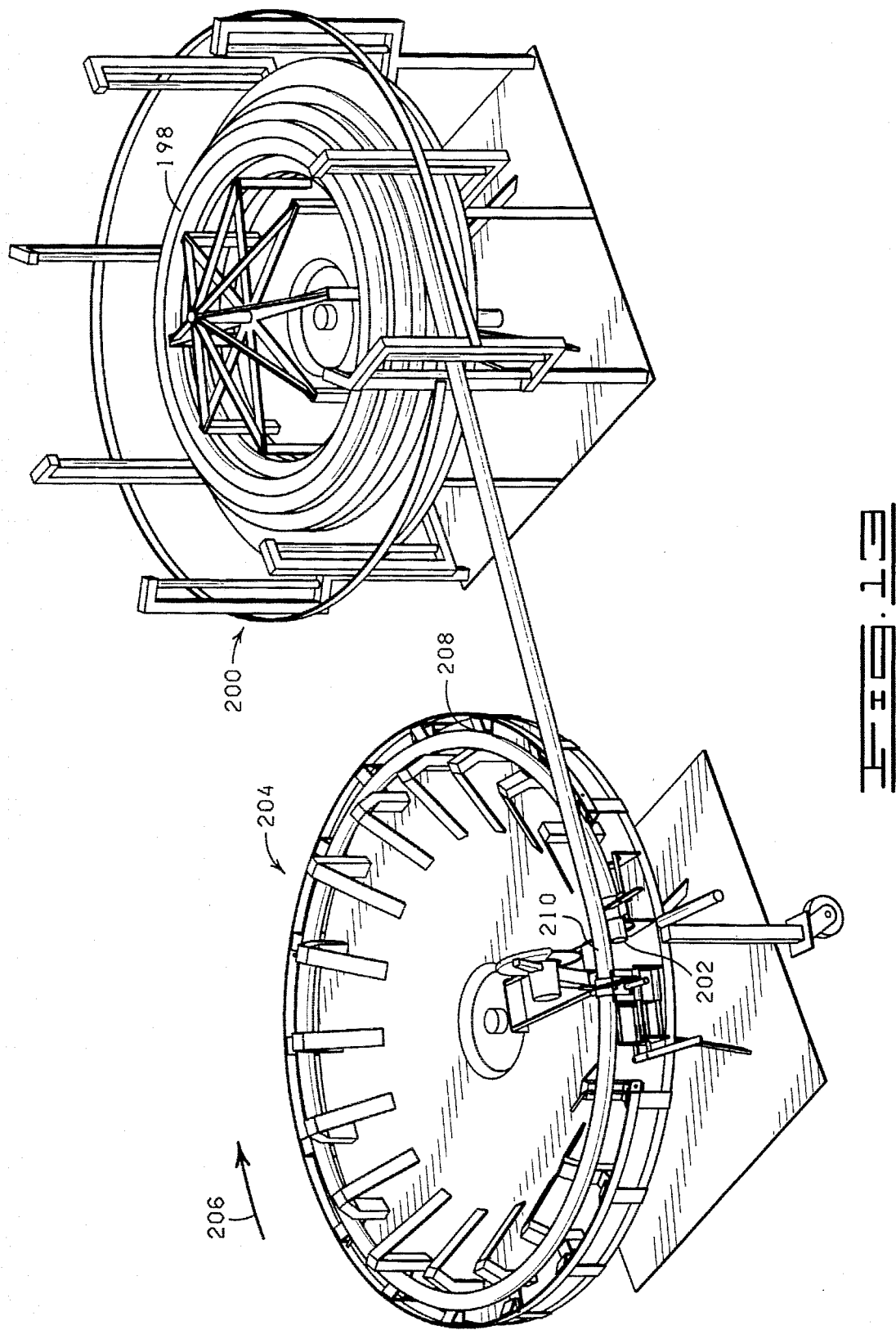

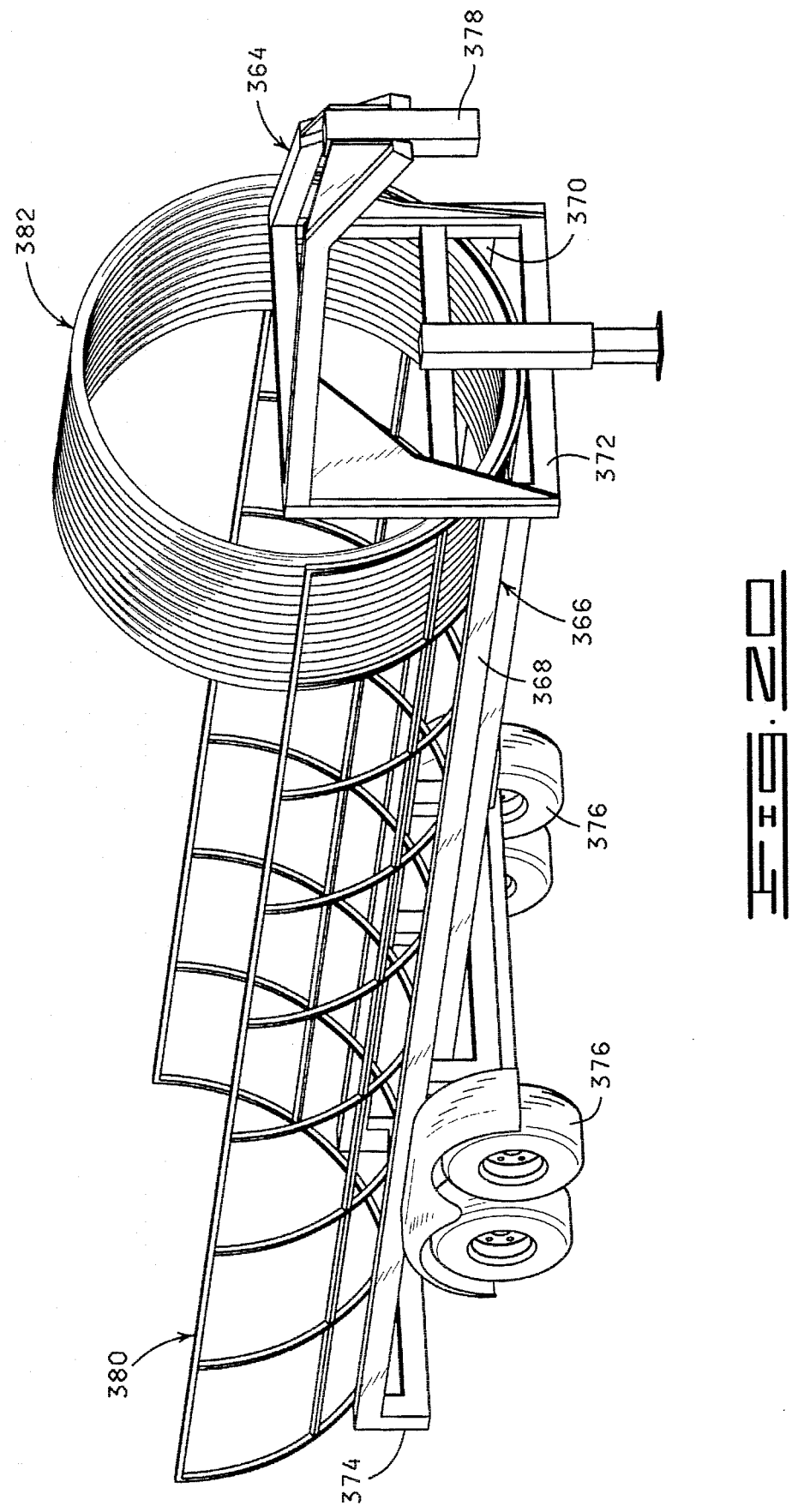

5,554,248

METHOD FOR MANUFACTURING A LIVESTOCK FEEDER

CROSS-REFERENCES

This application is a continuation-in-part of U.S. Ser. No. 08/170,489, entitled LIVESTOCK FEEDER, filed Dec. 20, 1993, now pending.

FIELD OF THE INVENTION

The present invention relates to a livestock feeder for retaining hay so that livestock can consume the hay while being restrained from trampling on the hay, and more particularly, but not by way of limitation, a method of manufacturing a livestock feeder from a tubular polymeric material.

BRIEF DESCRIPTION OF THE DRAWINGS

FIG. 4 is a fragmental perspective view of the livestock feeder of FIG. 1 illustrating angular displacement of an uppermost disposed retainer member in a downwardly direction.

FIG. 5 is a fragmental perspective view of a portion of the livestock feeder of FIG. 1 illustrating angular displacement of an uppermost disposed retainer member in a horizontal direction.

FIG. 6 is a fragmental, perspective view of a leg cutting table.

FIG. 11 is a perspective view of an aperture forming apparatus.

FIG. 12 is a cross sectional view of the aperture forming apparatus illustrating a leg member positioned therein.

FIG. 13 is a perspective view of a coil storage table and a loop forming table showing a portion of polyethylene pipe withdrawn from the coil storage table and fed into a loop forming groove of the loop forming table to form a loop configuration.

FIG. 20 is a perspective view of a another trailer depicting various non-assembled elements of the livestock feeder of the present invention positioned thereon.

DETAILED DESCRIPTION

Figure 1:
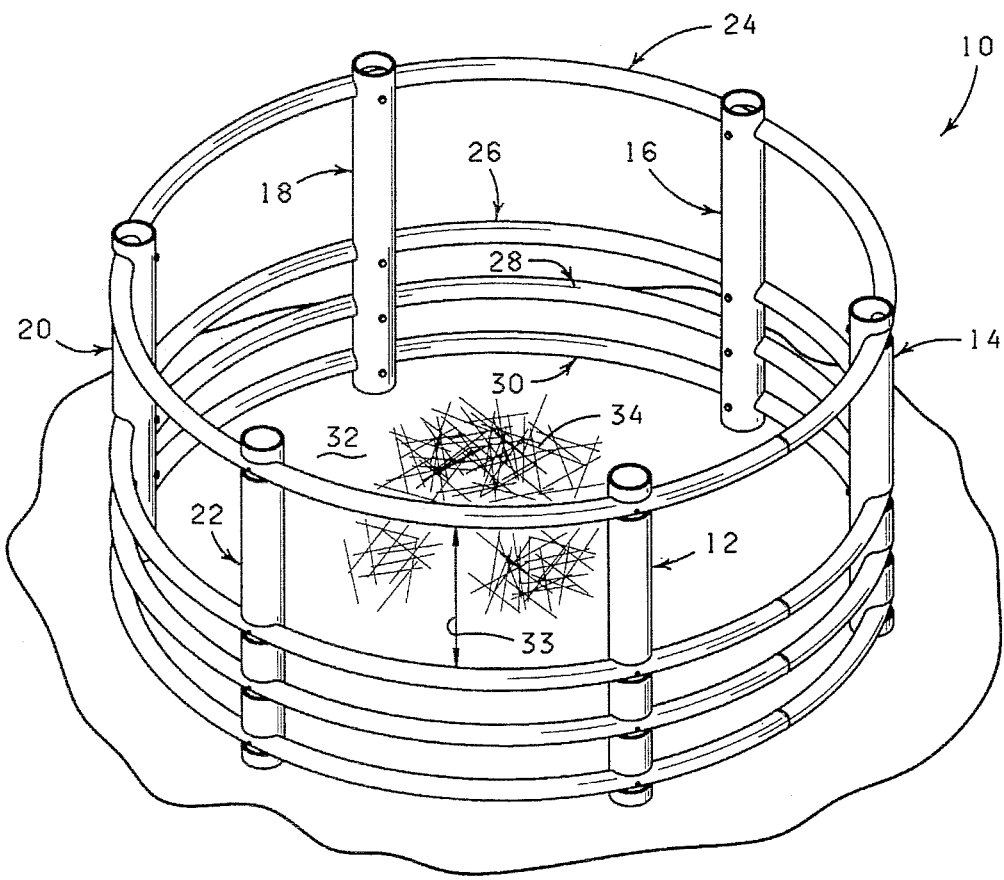
FIG. 1 is a perspective view of a livestock feeder constructed in accordance with the present invention.

Shown in FIG. 1 is a perspective view of a livestock feeder 10 constructed in accordance with the present invention. The livestock feeder 10 includes a plurality of spatially disposed leg members 12, 14, 16, 18, 20 and 22 and a plurality of substantially horizontal, spatially disposed retainer members 24, 26, 28 and 30 which are connected to such leg members so as to define a hay retaining space 32.

The retainer members 24, 26, 28 and 30 are fabricated of a polymeric material having angular deflection characteristics and sufficient memory properties so as to permit the retainer members 24, 26, 28 and 30 to be angularly deflected when pressures are exerted thereon by livestock and thereafter restored to a substantially non-deflected position when such pressures are removed. The retainer members 24 and 26 are disposed a selected distance 33 from each other, and each of the retainer members 24, 26, 28 and 30 is connected to the leg members 12, 14, 16, 18, 20 and 22 so as to define the hay retaining space 32. The distance 33 between the retainer members 24 and 26 permits access to hay 34 in the hay retaining space 32 by livestock, while the retainer members 26, 28 and 30 serve to retain the hay in the hay retaining space 32 and the retainer members 24, 26, 28 and 30 cooperate with the leg members 12, 14, 16, 18, 20 and 22 to prevent the livestock from entering into the hay retaining space 32 and trampling the hay 34.

The use of polymeric material to construct the livestock feeder 10 substantially eliminates problems associated with the rings becoming permanently deformed when engaged by an animal or otherwise, eliminates sharp edges, it will not rust, it will not break or split if water gets in the tubes and freezes, it eliminates the need for continual painting and it eliminates the need for metal welding.

Each of the leg members 12, 14, 16, 18, 20 and 22 are identical in construction and function, and each of the retainer members 24, 26, 28 and 30 are identical in construction. Thus, only the leg member 12 and the connection of the retainer member 24 to the leg member 12 will be described in detail with reference to FIGS. 1–3.

Figure 2:
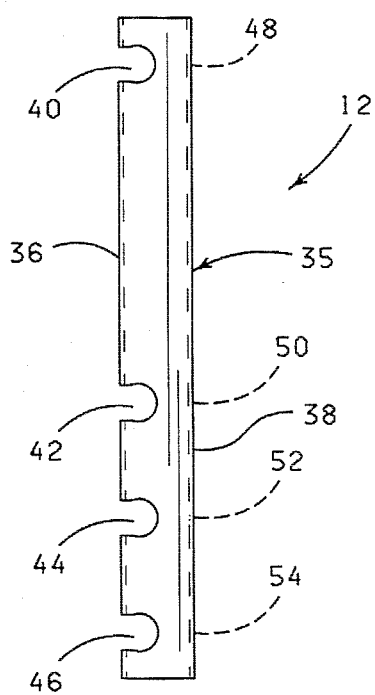
FIG. 2 is a side elevational view of a leg member of the livestock feeder of FIG. 1.
Figure 3:
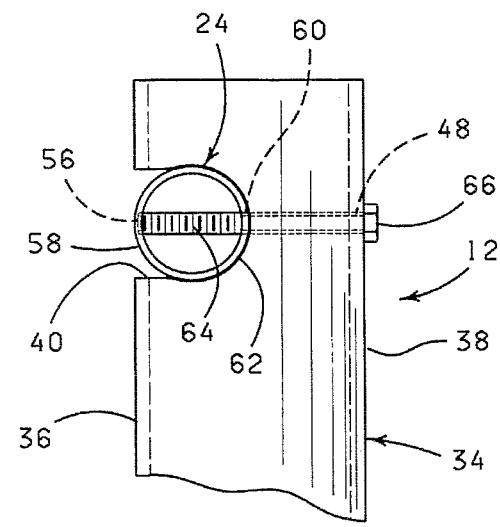
FIG. 3 is a fragmental, side elevational view of an upper portion of the leg member of the livestock feeder of FIG. 1 having a retainer member connected thereto.

The leg member 12 is a tubular member 35 having a first or outwardly disposed sidewall 36 and an opposed second or inwardly disposed sidewall 38. A plurality of spatially disposed retaining slots 40, 42, 44 and 46 are formed through the first sidewall 36 and a plurality of spatially disposed pilot apertures 48, 50, 52 and 54 (shown in phantom in FIG. 2) are formed through the opposed second sidewall 38 such that one of the pilot apertures is axially aligned with one of the retaining slots, such as the pilot aperture 48 and the retaining slot 40. The ring retaining slots 40, 42, 44 and 46 are configured and sized to supportingly receive the retainer members 24, 26, 28 and 30 substantially as shown in FIGS. 1 and 3. In one other embodiment, the ring retaining slots 40, 42, 44 and 46 are formed in the leg member 12 only to a small amount or distance and the retaining member 24, 26, 28 and 30 are disposed in the ring retaining slots 40, 42, 44 and 46 with a substantial portion of the retaining members 24, 26, 28 and 30 extending a distance outwardly from the leg members such as the leg member 12.

To enhance retention of the retainer members in the retaining slots of the leg members, such as the retainer member 24 in the retaining slot 40 of the leg member 12, as well as to stabilize the leg members in a substantially upright, vertically disposed position, a plurality of spatially disposed pilot apertures are formed through a sidewall of each of the retainer members and a plurality of spatially disposed axially aligned pilot apertures are formed through an opposed sidewall of each of the retainer members, such as pilot aperture 56 formed through sidewall 58 and axially pilot aperture 60 formed through sidewall 62 of the retainer member 24 substantially as shown in FIG. 3.

The axially aligned pilot apertures formed through the opposed sidewalls of the retainer members, such as the pilot apertures 56, 60 formed through the sidewalls 58, 62 of the retainer member 24, are spatially disposed along the retainer members so that the pilot apertures in the retainer members are alignable with the pilot aperture formed through the second sidewall of the leg members, such as the pilot aperture 48 formed through the sidewall 38 of the leg member 12. The pilot apertures in the leg members and the retainer members are sized such that upon positioning a connector member therethrough, such as a threaded shank portion 64 of a bolt 66, the threaded shank portion 64 threadedly engages the leg member 12 and the retainer member 24 so that the retainer member 24 disposed within the retaining slot 40 of the leg member 12 can be securely connected to the leg member 12.

To enhance the durability and portability of the livestock feeder 10, as well as to substantially eliminate the need for maintenance, the leg members 12, 14, 16, 18, 20 and 22 are desirably fabricated from a tubular polymeric material, such as polyethylene pipe. While the length, outer diameter and wall thickness of the polyethylene pipe employed in the fabrication of the leg members of the livestock feeder 10 can vary widely, desirable results can be obtained when the polyethylene pipe employed in the fabrication of each of the leg members 12, 14, 16, 18, 20 and 22 has a length of about 3½ feet, an outer diameter of from about 3½ inches to about 4½ inches and a wall thickness of at least about ⅜th of an inch.

The retainer members 24, 26, 28 and 30 are each provided with a substantially circular shaped configuration, as shown in FIG. 1, and the retainer members 24, 26, 28 and 30 are fabricated of a polymeric material having desired angular deflection characteristics and memory properties which permit the retainer members 24, 26, 28 and 30 to be angularly deflected when pressures are exerted thereon by livestock and yet restored to a substantially non-deflected position when such pressures are removed. Desirable results can be obtained wherein the polymeric material employed in the fabrication of the retainer members 24, 26, 28 and 30 is polyethylene pipe having an outer diameter of from about 1⅝ inch to about 3 inches and a wall thickness of from about 3/16 to about ⅜ of an inch.

The retainer members 24, 26, 28 and 30 are provided with a substantially unitary configuration. That is, the retainer members 24, 26, 28 and 30 are fabricated of the polyethylene pipe described above and formed into a circular configuration wherein the ends of the polyethylene pipe are secured together by any suitable means, such as heat welding, collars, nipples, adhesives and the like.

The livestock feeder 10 provides a convenient unit for defining a portable hay retaining space which can be readily assembled and disassembled for transportation from one location in a field or pasture to another.

One important feature of the livestock feeder 10 is the fabrication of its respective retainer members from a polymeric material having angular deflection characteristics and memory properties which permit such retainer members to be angularly deflected when pressures are exerted thereon by livestock and restored to a substantially non-deflected position when such pressures are removed. FIG. 4 depicts the angular deflection in a downward direction of a portion of the retainer member 24 of the livestock feeder 10 when a force is applied thereto by livestock in a downward direction as indicated by the arrow. FIG. 5, on the other hand, depicts the angular deflection in a horizontal direction of a portion of the retainer member 24 of the livestock feeder 10 when a force is applied thereto by livestock in the direction of the arrow.

The livestock feeder 10 of the present invention is especially suitable for feeding hay to cattle. However, when using the livestock feeder 10 of the present invention for feeding hay to horses it may be desirable to employ three retainer members in place of the four retainer members depicted and to shorten the overall height of the livestock feeders. Thus, horses can reach over the uppermost retainer member to access the hay retained in the livestock feeder and thereby prevent the retainer members from rubbing against the manes of the horses.

Several problems are encountered in the manufacturing of the retainer members 24-30 and the leg members 12-22 of the livestock feeder 10. First, the size of polyethylene pipe from which the leg members are preferably constructed is typically available in 40 ft. pieces which are cumbersome to handle. Further, the pipe is relatively hard which causes the accurate formation of the retaining slots 40-46 and the pilot apertures 48-54 to be difficult. With respect to the retainer members 24-30, the size of polyethylene pipe used for their construction typically comes in units of 500 ft. wound in a coil which is heavy and thus difficult to handle and manipulate. In addition, while the deflection and memory properties provide the advantages of the livestock feeder 10 of the present invention, it is these properties which makes the formation of the circular configuration of the retainer members 24-30 tedious. Thus, a need exists for an improved method for manufacturing the livestock feeder 10 of the present invention.

Referring now to FIG. 6, the leg members 12-22 are first cut to the desired length. Because of the length of the polyethylene pipe, a cutting table 68 as substantially depicted in FIG. 6 is utilized. The cutting table 68 includes a frame 70 supported by a plurality of legs 72. The frame 70 has a first side 74, a second side 76, a first end 78 and a second end 80. A plurality of cross members 82 are connected between the first and second sides 74, 76 to provide support to the frame 70. Additionally, a plurality of rollers 84 are connected between the first and second sides 74, 76 of the frame 70 to form a support surface which allows a segment of pipe to be easily moved along the cutting table 68. The frame 70 has a length sufficient to accommodate the length of the polyethylene pipe. The cutting table 68 is further provided with a storage rack 85 which includes a plurality of L-shaped members 87 secured to the second side 76 of the frame 70.

To facilitate cutting the pipe to the desired length, the frame 70 is provided with a plurality of guide members 86 and a stop member 88. The guide members 86 are secured to the cross members 82 and cooperate with a guide rail 90 attached to the second side 76 of the frame 70 to provide a pipe cutting slot 92. The guide members 86 are spaced from the guide rail 90 a distance to hold the pipe.

The cutting table 68 is further provided with a circular saw 94. The saw 94 is pivotally mounted to the second side 76 of the frame 70 a predetermined distance from the stop member 88 such that the saw 94 can be moved between a storage position, as shown in FIG. 4 and a cutting position.

In operation, a segment of polyethylene pipe is disposed on the cutting table 68 and positioned between the guide members 86 and the guide rail 90. The pipe is then positioned so that one end of the pipe is in contact with the stop member 88. The pipe is then cut by lowering the saw 94 to the cutting position thereby cutting the pipe to a predetermined length. As mentioned above, a preferable length of the leg members 12–22 is about 3½ ft.

Once the leg member has been cut to size, the retaining slots 40–46 are formed therein. The retaining slots 40–46 are formed with a slot forming apparatus 96 illustrated in FIGS. 7–10. The slot forming apparatus 96 includes a housing 98 supported on a plurality of legs 100 and which is characterized as having a first side 102, a second side 104, a upper side 106, a bottom side 108, a front side 110 and a rear side 112. The upper side 106 of the housing 98 is provided with a leg retaining slot 114 which is dimensioned to receive one of the cut leg members, such as leg member 12.

Figure 10:
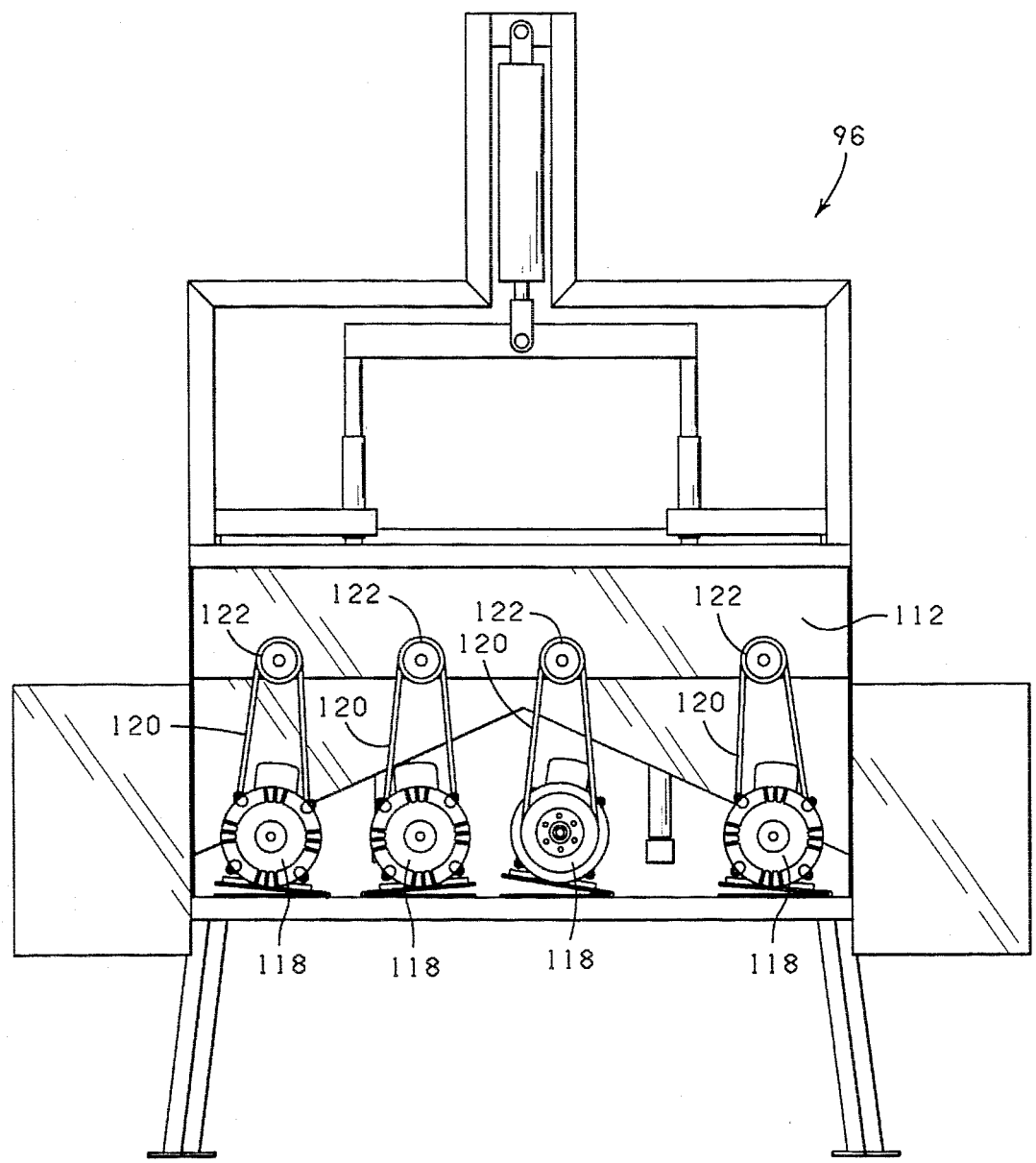
FIG. 10 is a rear elevational view of the slot cutting apparatus.

Four cutting members 116a, 116b, 116c and 116d are supported in the housing 98 such that the cutting members 116a, 116b, 116c and 116d traverse the leg retaining slot 114 substantially as shown. The cutting members 116a–116d are spaced apart to form the desired slot configuration on the leg members. More specifically, the cutting members 116c and 116d are spaced apart the distance 33 (FIG. 1) to permit access to the hay retaining space 32 by livestock, while the cutting members 116a–116c are spaced closer together to form a barrier to hay retaining space 32 (FIG. 1). The cutting members 116a–116b are each preferably a 2½ in.×4 in. reamer. As shown in FIG. 10, each cutting member 116a–116d is rotated by a 5 Hp motor 118 mounted on the rear side 112 of the housing 98 and operably connected to one of the cutting members 116a–116d via a belt 120 and a pulley 122.

Figure 8:
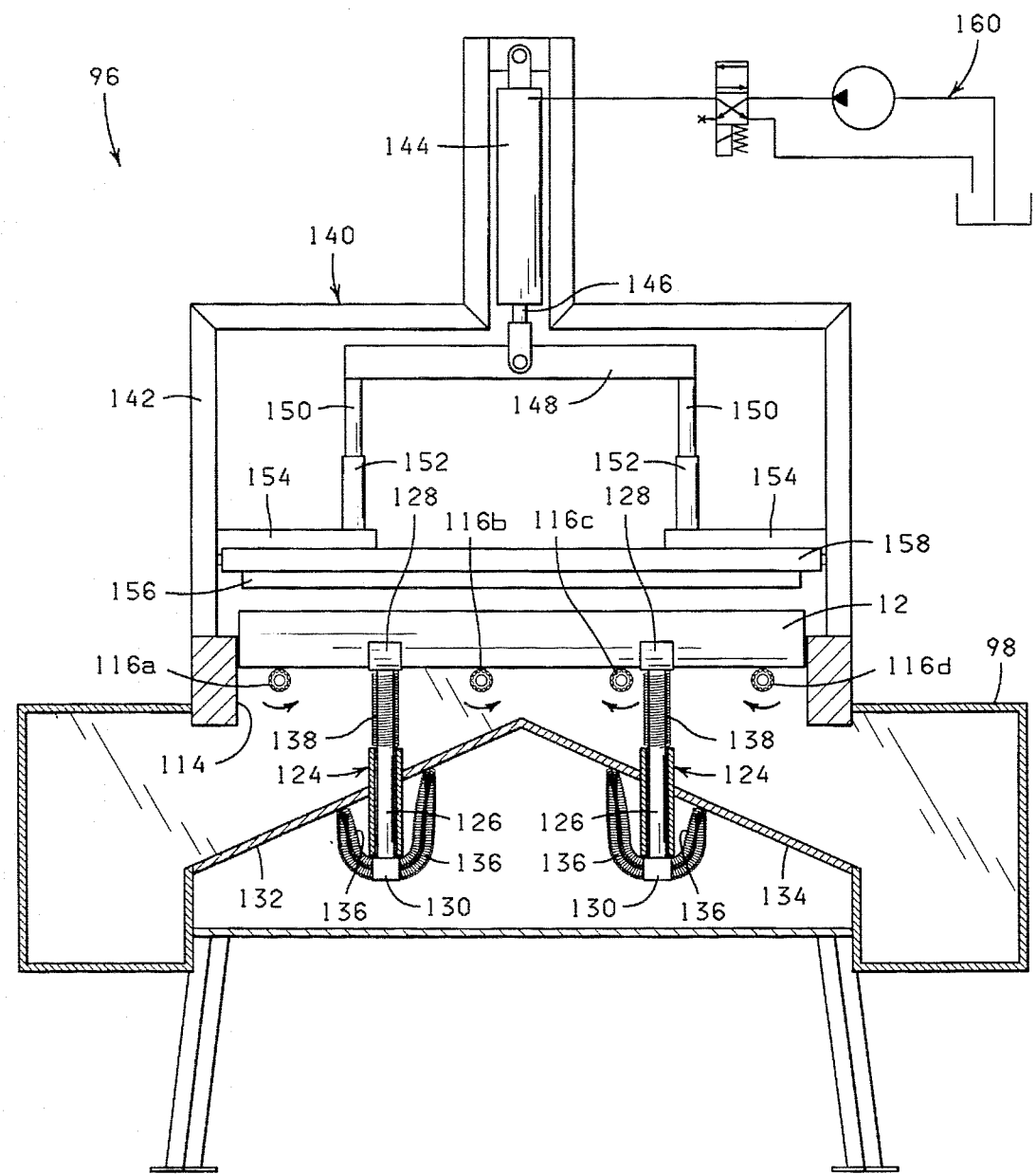
FIG. 8 is a partial cross section, front elevational view of the slot cutting apparatus showing a leg member disposed in a raised position.

As illustrated in FIG. 8, the cutting members 116a–116d are arranged so that cutting members 116a and 116b cut as they rotate in a counter clockwise direction and the cutting members 116a and 116d cut as they rotate in a clockwise direction. This arrangement prevents the leg member 12 from having a tendency to spin during the slot cutting process.

As shown in FIG. 8, the slot cutting apparatus 96 further includes a pair of leg support members 124 slidingly disposed in the housing 98. More particularly, each of the leg support members 124 includes a rod 126 having a C-shaped leg cradling portion 128 connected to one end and a U-shaped spring retaining portion 130 connected to the other end. The rod members 126 are slidingly disposed through a plate 132 and a plate 134, respectively. Each plate 132, 134 is angularly positioned in the housing 98 and serves to direct the waste cuttings as will be described below.

The leg support members 124 are adapted to support one of the leg members, such as the leg member 12 when such is disposed in the leg retaining slot 114 whereby the leg member 12 can be lowered onto the rotating cutting members 116a–116d and returned to a raised position so that the leg member 12 can be removed from the leg retaining slot 114. To this end, each of the leg support members 124 is elastically supported by a pair of extension springs 136. The ends of the extension springs 136 are connected to the bottom of the plate 132 or 134 and the spring retaining portion 130 rests on the medial portion of the extension springs 136. Each of the leg support members 124 is further supported by a compression spring 138 disposed about an upper portion of the rod member 126. The compression spring 138 is disposed between the leg cradling portion 128 and the top of the plate 132 or 134.

To effect the cutting of the retaining slots 40–46 into the leg member 12, the leg member 12 is pressed onto the cutting members 116a–116b as the cutting members are rotating. So that the retaining slots 40–46 are cut to the desired depth, the retaining slot cutting apparatus 96 is constructed such that the leg member 12 is lowered only a predetermined distance. More specifically, the slot cutting apparatus 96 is provided with a leg lowering assembly 140 which allows an operator to lower the leg member 12 onto the cutting members 116a–116d at a suitable pace and a regulated distance.

Figure 7:
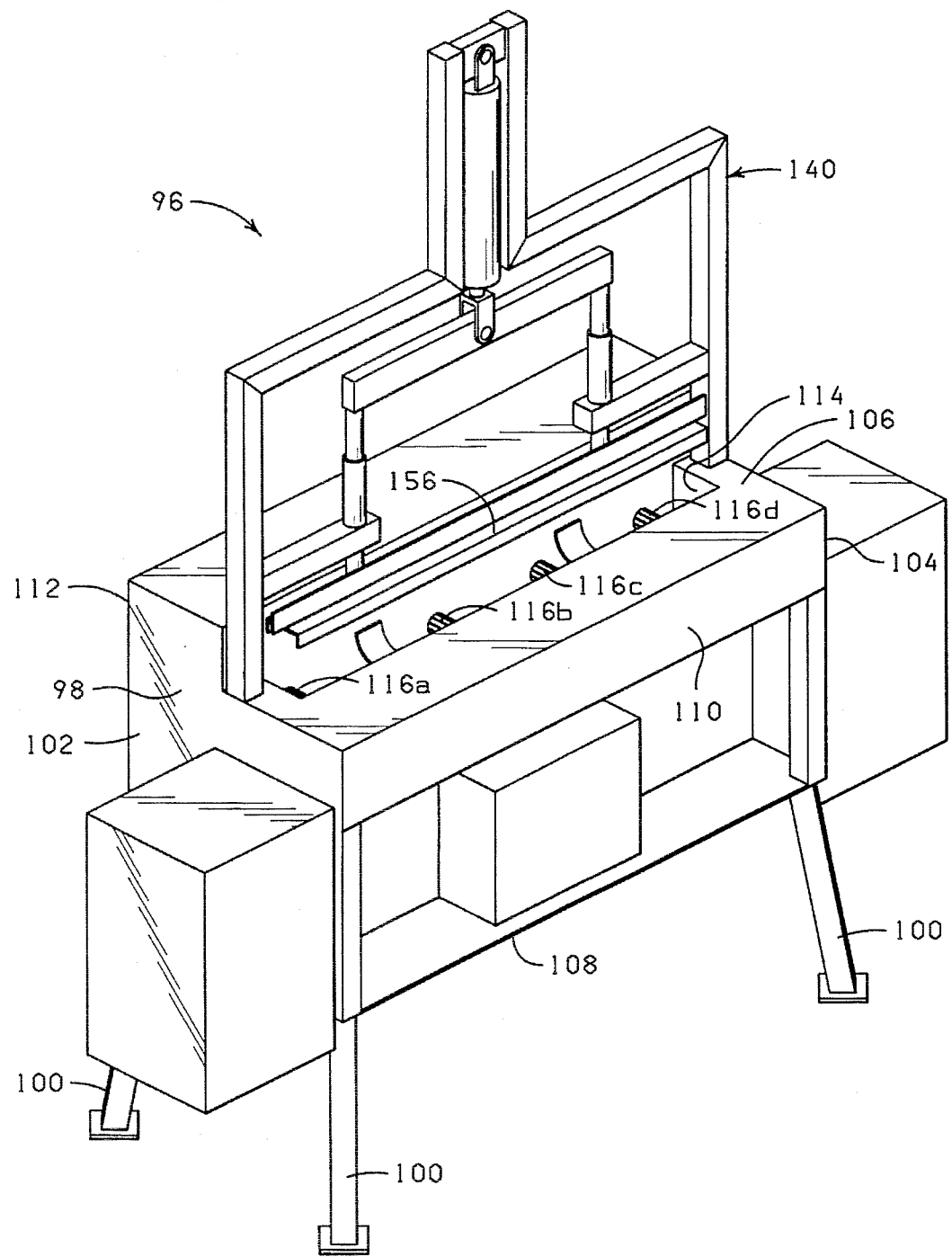
FIG. 7 is a perspective view of a slot cutting apparatus.
Figure 9:
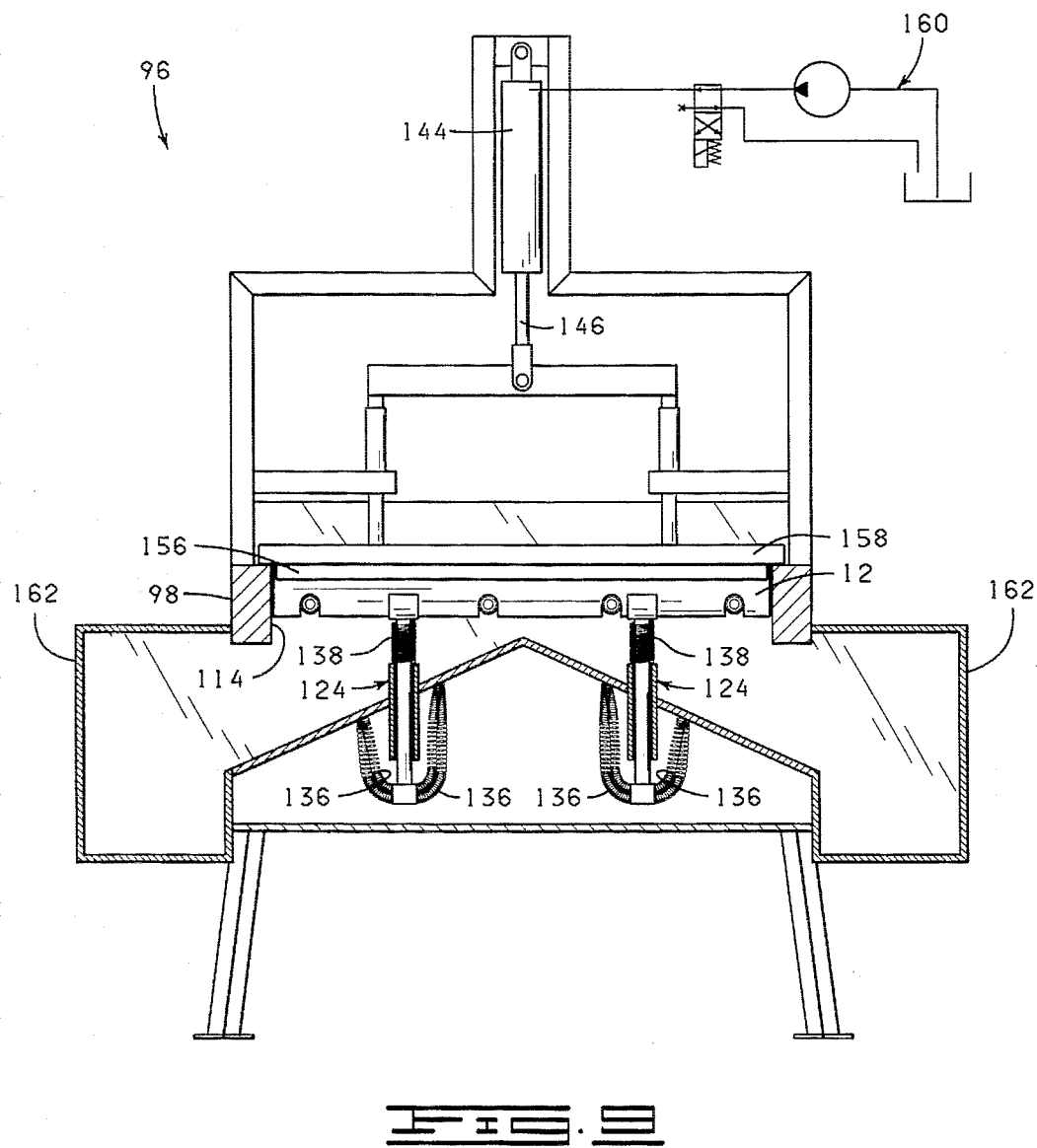
FIG. 9 is a partial cross section, front elevational view of the slot cutting apparatus showing a leg member disposed in a lowered position.

The leg lowering assembly 140 includes a support frame 142 connected to the upper side 106 of the housing 98 so as to extend above and about the leg retaining slot 114. A hydraulic cylinder 144 with a piston rod 146 having a piston (not shown) operably disposed therein is connected to the top of the support frame 142. The piston rod 146 is in turn connected to a cross bar 148 provided with a pair of support rods 150 extending vertically downward from the ends of the crossbar 148. Each support rod 150 is slidingly disposed through a guide sleeve 152 connected to the support frame 142 via a horizontal support bar 154 which is attached to the support frame 142 as shown. The horizontal support bar 154 is provided with a hole (not shown) so that the support rod 150 slidingly extends through the support bar 154. A leg engagement member 156 is connected to the support rods 150 and is dimensioned to fit into the leg retaining slot 114. As best shown in FIGS. 7 and 9, the leg engagement member 156 is preferably channel-shaped so as to extend partially about the leg member to engage the leg member 12 in a stable manner.

A regulating member 158 is connected to the leg engagement member 156 for regulating the depth which the leg engagement member 156 is permitted to extend into the leg retaining slot 114. The regulating member 158 is a flat bar having a length greater than the length of the leg retaining slot 114 so that the regulating member 156 extends beyond the ends of the leg engagement member 156 when the regulating member 158 is connected to the leg engagement member 156. The portion of the regulating member 158 extending over the ends of the leg engagement member 156 engages a portion of the housing 98 when the leg engagement member 156 is lowered to press the leg member 12 against the cutting members 116a–116d, thereby functioning as a stop member and regulating the depth which the leg engagement member 156 can be lowered into the leg retaining slot 114.

In operation, one of the leg members, such as the leg member 12, is placed into the retaining slot 114 onto the leg support members 124. The cutting members 116a–116d are actuated so that they are rotating as indicated by the arrows in FIG. 8. The hydraulic cylinder 144 is then actuated with a hydraulic system 160 (schematically illustrated in FIG. 8) thereby causing the leg engagement member 156 to be lowered onto the leg member 12. Further lowering of the leg engagement member 156 presses the leg member 12 onto the rotating cutting members 116a–116d. The leg engagement member 156 is lowered until the regulating member 158 engages the portion of the housing 98 adjacent to the leg retaining slot 114, as illustrated in FIG. 9, thereby indicating that the retaining slots 40–46 have been cut to the desired depth.

Once the retaining slots 40–46 have been formed, the hydraulic system 160 is used to raise the leg engagement member 158 and remove it from contact with the leg member 12. The extension springs 136 and the compression springs 138 cooperate to raise the leg support members 124 so that the leg member 12 can be removed from the leg retaining slot 14.

The waste cuttings produced during the cutting process fall into one of two waste containers 162 provided on the first and second sides 102, 104 of the housing 98. The waste containers 162 are in communication with the interior of the housing 98 as best illustrated in FIGS. 8 and 9. The cuttings which come from the leg member 12 are transported to the waste containers 162 via the plates 132 and 134 respectively which are angularly disposed in the interior of the housing 98 below the cutting members 116a–116d to allow the cuttings to slide into the waste containers 162. After a sufficient amount of cuttings have been collected the cuttings are collected and disposed of in a proper manner.

With the retaining slots 40–46 formed in the leg member 12, the pilot apertures 48–52 are then formed. As described above, the pilot apertures 48–52 are formed through the opposed second sidewall 38 such that one of the pilot apertures is axially aligned with one of the retaining slots, such as the pilot aperture 48 and the retaining slot 40 as shown in FIG. 2. The pilot apertures in the leg members and the retainer members are sized such that upon positioning a connector member therethrough, such as the threaded shank portion 64 of the bolt 66, the threaded shank portion 64 threadedly engages the leg member 12 and the retainer member 24 so that the retainer member 24 disposed within the retaining slot 40 of the leg member 12 can be securely connected to the leg member 12.

The forming of the pilot apertures 48–52 is facilitated with the use of an aperture forming apparatus 164 illustrated in FIGS. 11 and 12. The aperture forming apparatus 164 includes a support frame 166 having a first side 168, a second side 170, a first end 172, and a second end 174. The support frame 166 is supported by a plurality of legs 176 and forms a leg receiving opening 178 which is dimensioned so that the leg members fit therein. Four slot alignment members 180a–180d are secured across the leg receiving opening 178 between the first and second sides 168, 170 of the support frame 166. The slot alignment members 180a–180d are cylindrically shaped and spaced apart to receive a corresponding retaining slot 40–46, thereby vertically aligning the retaining slots 40–46 and the opposing sidewall 38.

The aperture forming apparatus 164 is further provided with a guide frame 182 having a first side 184, a second side 186, a first end 188, and a second end 190. The guide frame 182 is hingedly connected to the support frame 166 so that the guide frame 182 can be raised and lowered relative to the support frame 166. The guide frame 182 is provided with a plurality of drill guides 192 which are secured between the first and second sides 184, 186 of the guide frame 182. Each drill guide 192 is a tubular member 193 disposed through a pair of plate members 194 which are in turn secured to the first and second sides 184, 186 of the guide frame 182 so as to center the drill guides 192 above one of the slot alignment members 180a–180d when the guide frame 182 is lowered, as illustrated in FIG. 12. A handle 196 is attached to the first side 184 of the guide frame 182 to facilitate the raising and lowering of the guide frame 182.

In operation, one of the leg members such as leg member 12, is placed in the leg receiving opening 178 with the retaining slots 40–46 of the leg member 12 disposed over the corresponding slot alignment members 180a–180d. With the leg member 12 positioned in the leg receiving opening 178, the guide frame 182 is lowered as shown in FIG. 12 so that the drill guides 192 are positioned above the leg member 12 opposite the retaining slots 40–46. Next, a drilling device, such as an electric hand drill (not shown) is used to drill the pilot apertures 48–52 by inserting the drill bit of the hand drill into each of the drill guides 192 and engaging the drill bit against the leg member 12 with sufficient pressure to drill the pilot aperture therethrough. As a result of the construction of the aperture forming apparatus 164, the pilot apertures 48–52 (FIG. 2) are properly disposed on the sidewall 38 opposite the sidewall 36 in which the retaining slots 40–46 are formed such that each of the pilot apertures 48–52 is axially aligned with one of the retaining slots 40–46.

As mentioned above, the size of the polyethylene pipe preferred for the retainer members 24–30 is commonly sold in units of 500 ft. packaged in the form of a coil having a diameter of about seven feet and a height of 1½ feet. The size and weight of the coil poses handling problems and the physical properties of the polyethylene pipe mentioned above makes the manipulation of the pipe into a circular configuration cumbersome and time consuming.

Figure 14:
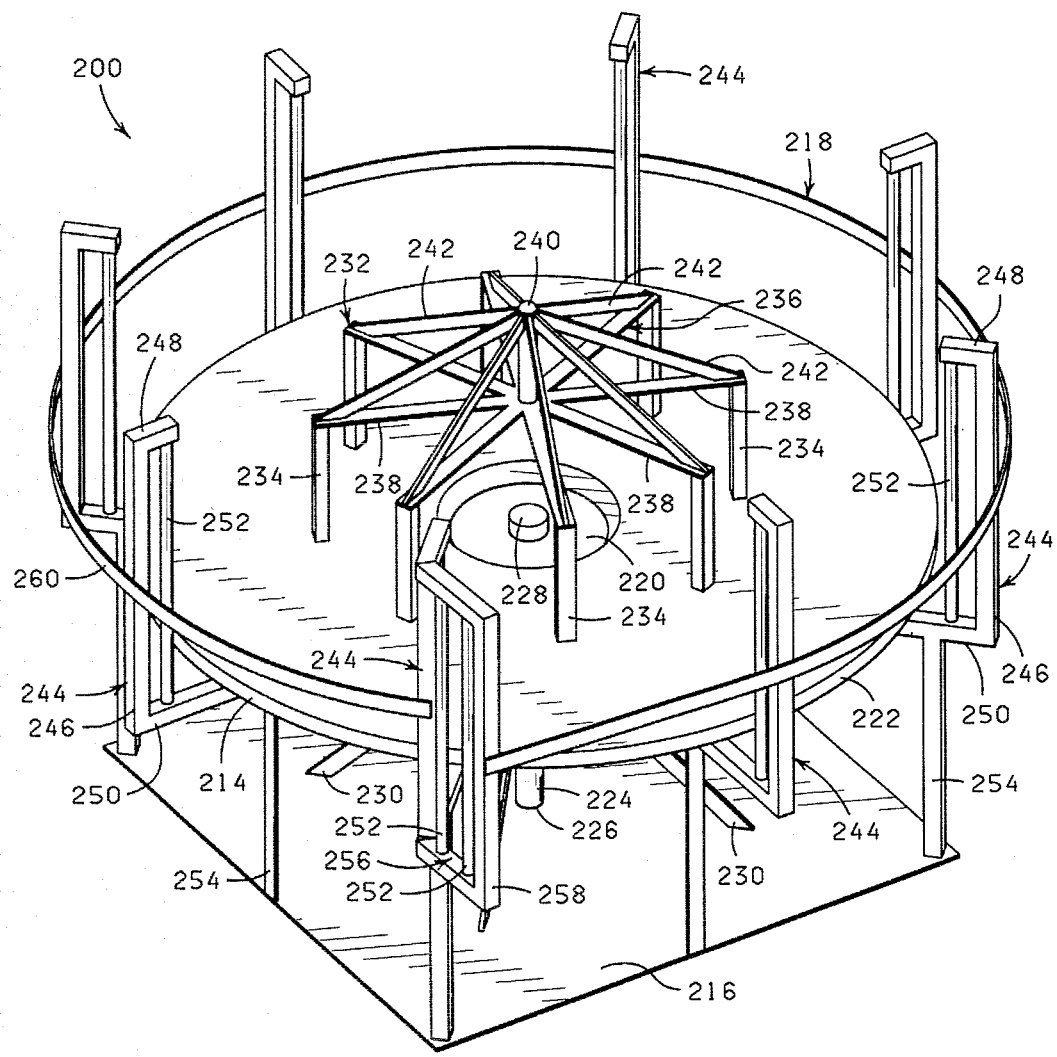
FIG. 14 is a perspective view of the coil storage table.
Figure 15:
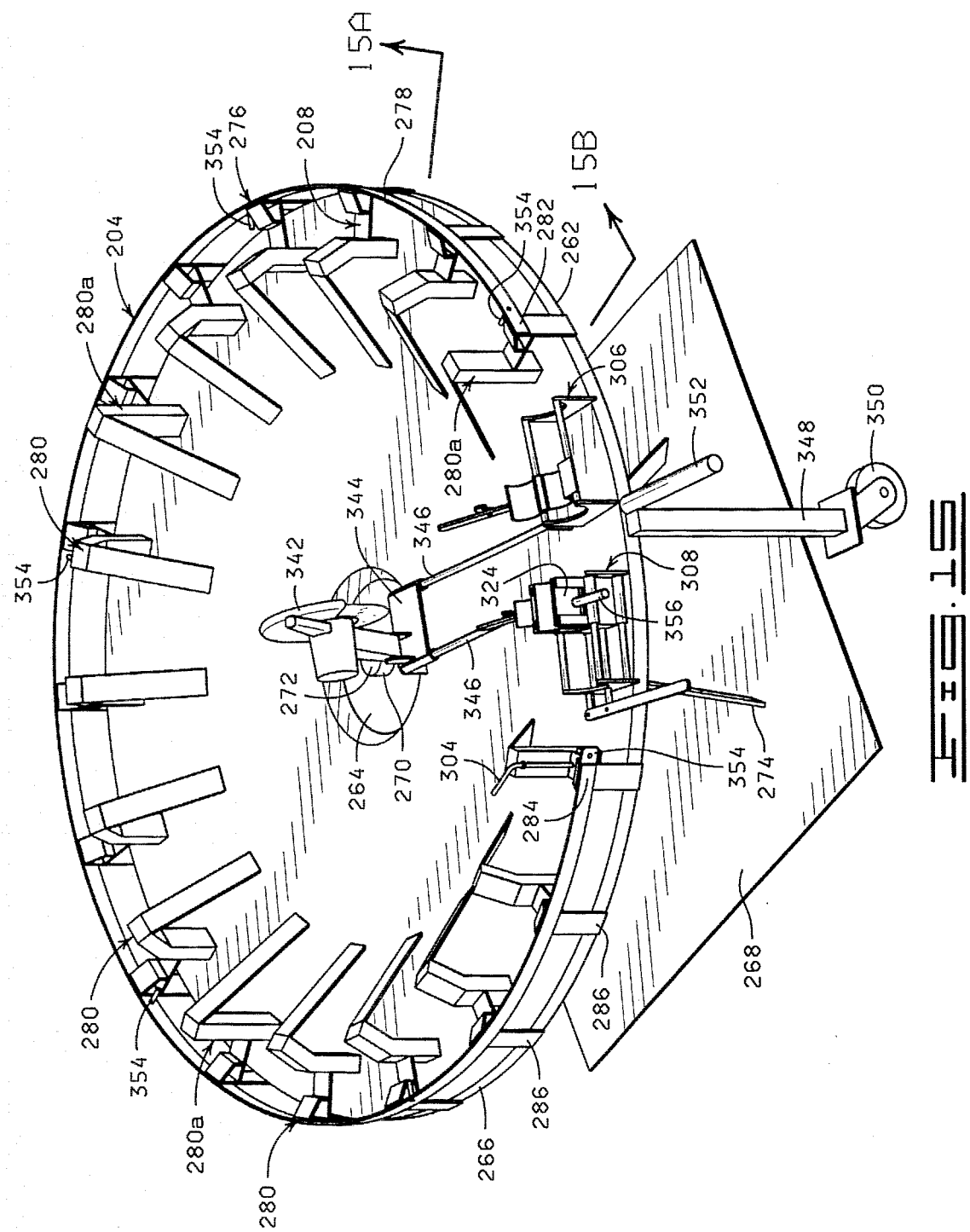
FIG. 15 is a perspective view of the loop forming table.

Referring now to FIGS. 13–15, a coil of tubular polyethylene pipe 198 is shown disposed on a material storage table 200 which is adapted to contain the coil of pipe 198 and to permit a quantity of pipe or material to be easily withdrawn from the coil 198. To form one of the retainer members 24–30, a portion of the material is withdrawn from the coil 198 and a first end 202 of the pipe is clamped to a loop forming table 204 positioned adjacent to the material storage table 200. The loop forming table 204 is adapted for forming the polyethylene pipe into a retainer member. The loop forming table 204 is rotatable in a material feeding direction indicated by the arrow 206. As the loop forming table 204 is rotated in the material feeding direction, additional pipe is withdrawn from the coil 198 and fed into a loop forming groove 208 provided about the periphery of the loop forming table 204.

Figure 16:
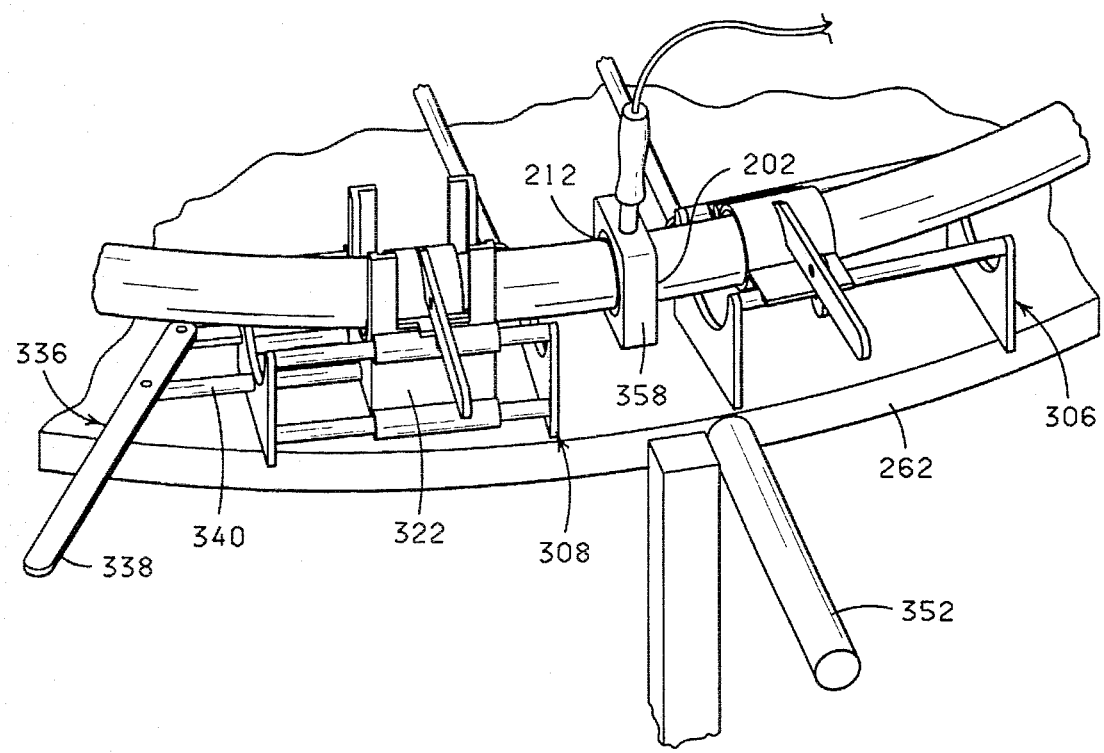
FIG. 16 is a fragmental, perspective view of the loop forming table illustrating the ends of the retainer member being heated with a heating pad.

The loop forming table 204 is rotated 360 degrees in the material feeding direction 206 until a distal portion 210 of the pipe overlaps the first end 202 of the pipe, as shown in FIG. 13. The pipe is then cut at the distal portion 210 substantially adjacent to the first end 202 of the pipe so as to produce a second end 212 (FIG. 16). With the pipe cut to the proper size and shaped into a looped configuration, the first and second ends 202, 212 of pipe are connected to form a retainer member so that the retainer member has a closed loop configuration.

As best shown in FIG. 14, the material storage table 200 includes a circular turntable 214 for holding the coil of material 198, a base plate 216 and a containment frame 218. The turntable 214 has a hub portion 220 and an outer peripheral portion 222. The turntable 214 is supported a distance above the base plate 216 with an axle 224 having a first end 226 and a second end 228. The first end 226 of the axle 224 is rigidly connected to the base plate 216 and the second end 228 is journaled to the hub portion 220 of the turntable 214 so as to permit the turntable 214 to rotate about the axle 224. In order to maintain the axle 224 in a substantially vertical position, the axle 224 is braced with a plurality of support members 230. The support members 230 are equally spaced about a medial portion of the axle 224 and extended angularly downward to the base plate 216 to which they are connected.

To aid in disposing the coil of material 198 onto the turntable 214 and to ensure that the coil 198 remains properly centered on the turntable 214 when disposed thereon, the turntable 214 is provided with a positioning hub assembly 232 which extends about and above the hub portion 220 of the turntable 214. The positioning hub assembly 232 includes a plurality of retaining members 234 connected to the turntable 214 so as to be equally spaced about the turntable 214 a distance radially outward from the hub portion 220 so as to accommodate the inner diameter of the coil of material 198. The retaining members 234 are braced at the upper end thereof by a spoke assembly 236 having a plurality of spoke members 238. Each spoke member 238 is connected to a corresponding retainer member 234 thereby causing the spoke assembly 236 to interconnect the retaining members 234 with the spoke assembly 236 suspended about the hub portion 220 of the turntable 214 so as not to interfere with the rotation of the turntable 214.

A pole member 240 is connected to the center of the spoke assembly 236 and extended vertically upward. The pole member 240 serves as a connecting structure for a plurality of guide bars 242. Each of the guide bars 242 are connected to the top of the pole member 240 and to the outer end of a corresponding spoke member 238 so as to form a conical configuration. This conical configuration formed by the guide bars 242 facilitates the disposal of the coil of material 198 onto the turntable 214 by enabling the coil of material 198 to slide off of the guide bars 242 and onto the turntable 214 if the coil of material 198 should come into contact with the positioning hub assembly 232 as the coil of material 198 is being disposed on the turntable 214.

When the coil of material 198 is initially placed on the turntable 214, the coil typically be held together with one or more bands or straps provided by the manufacturer of the pipe. The straps must be removed from the coil so that the material can be uncoiled. In that the polyethylene pipe has memory characteristics which cause the pipe to want to straighten, the material will have a tendency to spring outwardly thereby uncoiling once the straps have been removed. To contain the material in a coiled configuration after the straps are removed from about the coil of material, the material storage table 200 is provided with the containment frame 218.

The containment frame 218 is supported on the base plate 216 and extends about the outer peripheral portion 222 of the turntable 214. The containment frame 218 includes a plurality of vertical containment members 244 positioned a sufficient distance from the outer peripheral portion 222 of the turntable 214 so as not to interfere with the rotation of the turntable 214. Each of the containment members 244 comprises a vertical support member 246, an upper horizontal support member 248, a lower horizontal member portion 250 and a roller 252. Each of the lower horizontal support members 250 extends radially inward toward the axle 224 and interconnects with the other lower horizontal support members 250 in a circular fashion about the axle 224. Each of the lower horizontal support members 250 is supported by a leg member 254 having one end connected to a portion of the lower horizontal support member 250 and the other end secured to the base plate 216.

The vertical support member 246 has one end connected to the lower horizontal support member 250 and the other end connected to one of the ends of the upper horizontal support member 248 so as to form a bracket for supporting the roller 252. That is, the roller 252 is extended between the upper horizontal support member 248 and the lower horizontal support member 250 parallel with the vertical support member 246 so as to be engagable with the unrestrained coil of material 198. The rollers 252 serve to contain the tubular polyethylene pipe in a coiled configuration while at the same time allowing the material to rotate in conjunction with the rotation of the turntable 214.

As shown, one of the containment members 244 is modified to form a material outlet 256. More specifically, a bracket member 258 is connected to, and angularly extended from, one of the containment members 244. A pair of rollers 252 are secured to the bracket 258 in a parallel, vertical relationship so as to form the material outlet 256 through which the pipe can be withdrawn and pulled to the adjacent loop forming table 204 for formation of the retainer members 24–30. A band 260 is extended about the containment members 244 and connected thereto to provide additional support to the containment frame 218.

FIG. 15 more clearly illustrates the loop forming table 204. Like the material storage table 200, the loop forming table 204 includes a circular turntable 262 having a hub portion 264 and an outer peripheral portion 266. The loop forming table 204 is supported a distance above a base plate 268 with an axle 270 having a first end (not shown) and a second end 272. The first end (not shown) of the axle 270 is rigidly connected to the base plate 268 and the second end 272 is journaled to the hub portion 264 of the loop forming table 204 so as to permit the loop forming table 204 to rotate about the axle 270. In order to maintain the axle 270 in a substantially vertical position, the axle 270 is braced with a plurality of support members 274. The support members 274 are equally spaced about a medial portion of the axle 270 and extended angularly downward to the base plate 268 to which they are connected.

The loop forming groove 208 is formed with a groove forming assembly 276 which includes a support rail 278 and a plurality of groove configurations 280 disposed along the outer peripheral portion 266 of the turntable 262. The support rail 278 having a first end 282 and a second end 284 is extended partially about the outer peripheral portion 266 of the turntable 262 as shown. The support rail 278 is supported with a plurality of support members 286 connected to the outer edge of the turntable 262. A portion of each of the groove configurations 280 is connected to the inner side of one of the support members 286. As such, the number of groove configurations 280 corresponds to the number of support members 286.

Figure 15A:
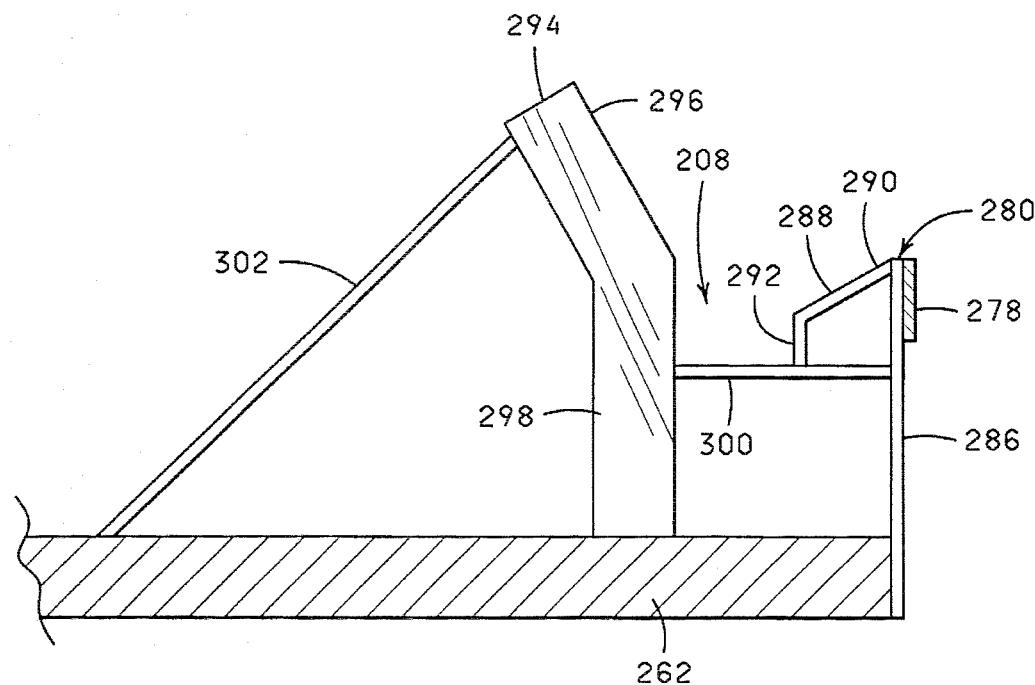
FIG. 15A is a fragmental, partially cross sectional view taken at 15A in FIG. 15 illustrating a groove configuration.

As best illustrated in FIG. 15A, each of the groove configurations 280 includes an outer member 288 having an upper angled portion 290 and a lower vertical portion 292, an inner member 294 having an upper angled portion 296 and a lower vertical portion 298, and a bottom support plate 300. The bottom support plate 300 is extended radially inwardly from the inner side of the support member 286. The inner member 294 is connected to the turntable 262 and attached to the other end of the support plate 300. Thus, the support plate 300 serves to position the inner member 294 a proper distance from the support member 300 and the rail 278. The outer member 288 is connected to the inner side of the support member 286 and to a portion of the support plate 300. The inner members 294 are further supported with a brace 302 having one end connected to the upper portion 296 of the inner member 294 and another end connected to the turntable 262.

The outer member 288 and the inner member 294 are spaced apart such that the lower portions 292, 298 of the outer member 288 and the inner member 294, respectively, cooperate to form a portion of the loop forming groove 208 for holding the tubular polyethylene pipe used to form the retainer members 292, 298. The portion of the support plate 300 between the lower portions 292, 298 of the outer member 288 and the inner member 294 serves to support the tubular material when same is disposed in the loop forming groove 208. The upper angled portions 290, 296 of the outer member 288 and the inner member 294 cooperate to guide the tubular material into the loop forming groove 208 by funneling the tubular material to the loop forming groove 208.

Figure 15B:
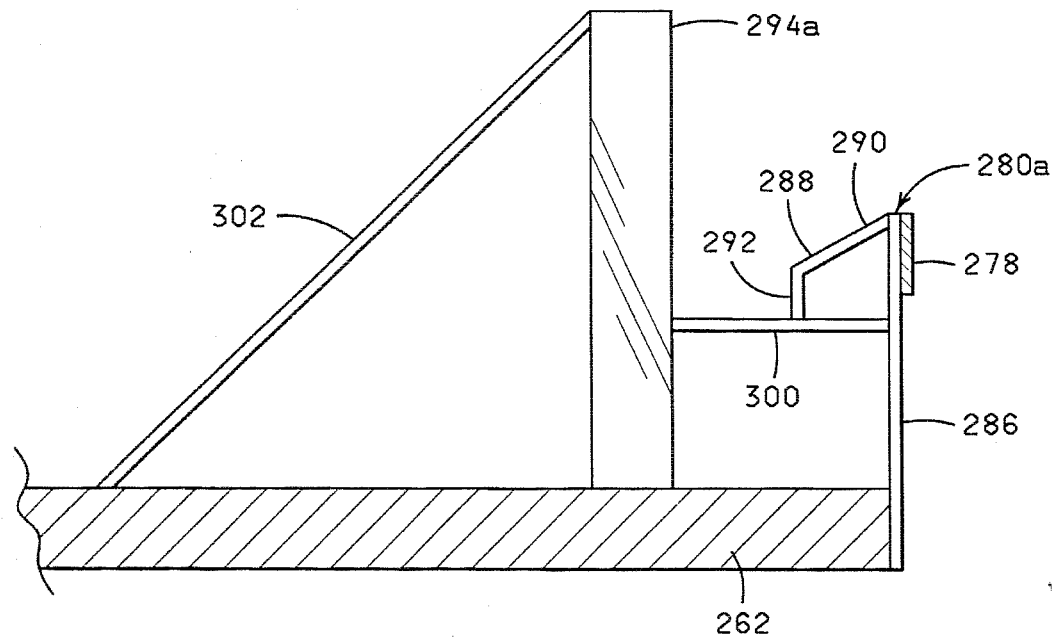
FIG. 15B is a fragmental, partially cross sectional view taken at 15B in FIG. 15 illustrating a modified groove configuration.

As shown in FIG. 15, the construction of some of the groove configurations 280 is varied. That is, groove configurations 280a (FIG. 15B) are provided with a straight inner member 294a rather than an inner member having an angled portion such an groove configurations 280. Such a configuration serves to ensure the retention of the polyethylene pipe in the loop forming groove 208 during the step of connecting the ends of the polyethylene pipe.

The inner member 294 adjacent the second end 284 of the support rail 278 is provided with a push rod 304 which causes the second end 212 of the pipe to remain in an inwardly curved shape during the process of connecting the first end 202 of the pipe to the second end 212 since the polyethylene pipe has a tendency to straighten.

Figure 18:
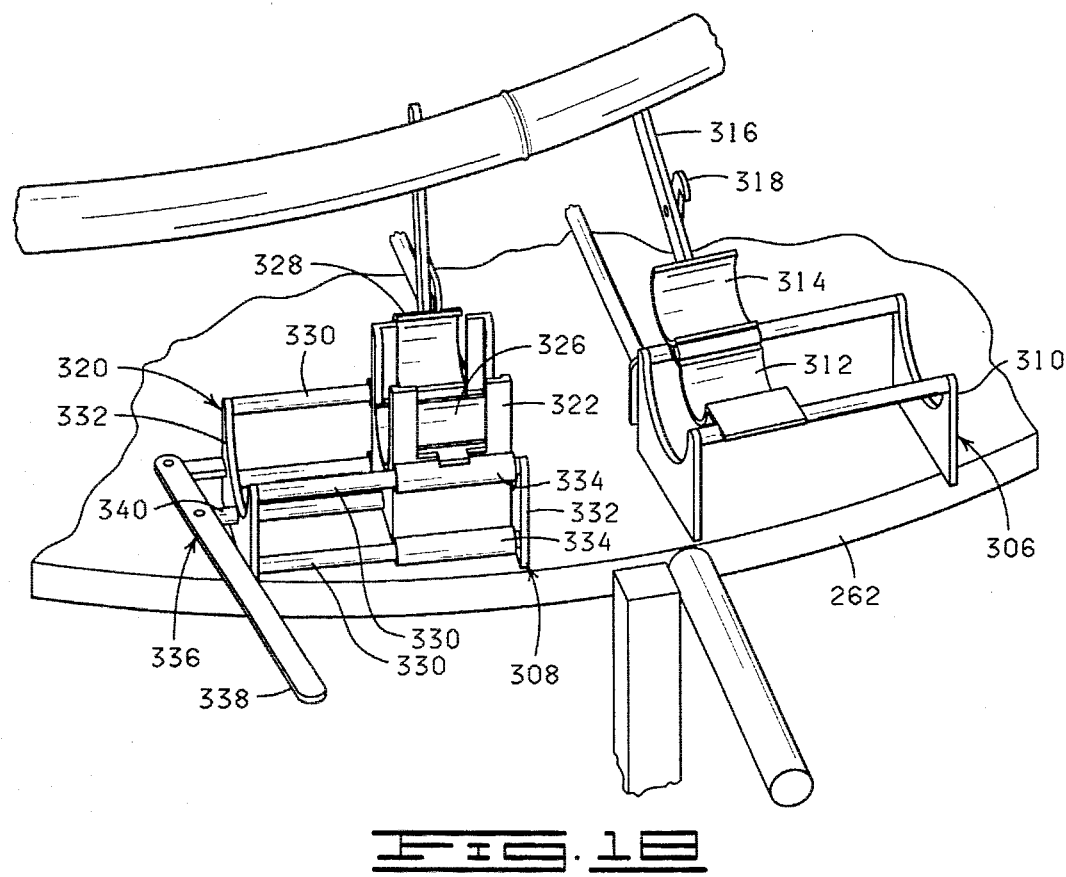
FIG. 18 is a fragmental, perspective view of the loop forming table illustrating the ends of the retainer member fused together and removed from the loop forming table.

A first clamp assembly 306 and a second clamp assembly 308 are mounted on the peripheral portion 266 of the turntable 262 between the first end 282 and the second end 284 of the support rail 278 and are adapted for holding the first end 202 and the distal end 210 of the pipe, respectively. Referring to FIG. 18, the first clamp assembly 306 includes a clamp support frame 310, a first clamp member 312, and a second clamping member 314; the second clamp member 314 being pivotally connected to the first clamp member 312. Each of the first and second clamp members 312, 314 are shaped so that the first and second clamp members 312, 314 cooperatively extend about the outer diameter of the pipe to hold the first end 202 of the pipe. The first clamp assembly 306 is rigidly mounted to a clamp support frame 310 which is in turn connected to the turntable 262 such that the first clamp member 312 is substantially coplanar with the bottom support plates 300 of the loop forming assembly 276 (FIG. 15). The second clamp member 314 is provided with a handle 316 having a latch member 318 which cooperates with a portion of the first clamp member 312 to lock the first and second clamp members 312, 314 together about the first end 202 of the pipe.

The second clamp assembly 308 is mounted to the turntable 262 between the first clamp assembly 306 and the second end 284 of the support rail 278 (FIG. 15). The second clamp assembly 308 includes a clamp support frame 320, a clamp housing 322 (FIG. 15), a clamp block 324, a first clamp member 326 and a second clamp member 328. The first and second clamp members 326, 328 are identical in configuration to the first and second clamp members 312, 314 described above thus a detailed description of the first and second clamp members 326, 328 will not be repeated.

The first clamp member 326 of the second clamp assembly 308 is rigidly mounted on the clamp block 324 which is slidably disposed in the clamp housing 322 thus allowing the clamp block 324 along with the first and second clamp members 326, 328 to be set in a raised position relative to the first and second clamp members 312, 314 of the first clamp assembly 306 (FIG. 15) and to be set in a lowered position wherein the first clamp member 326 of the second clamp assembly 308 is aligned with the first clamp member 312 of the first clamp assembly 306 (FIG. 18). The importance of this will be described below.

The support frame 320 includes a plurality of parallel guide rods 330 connected between a pair of end plates 332. Each of the guide rods 330 is slidably received by a corresponding sleeve 334 provided on the clamp housing 322 so as to permit the clamp housing 22 to be moved back and forth along the guide rods 330.

To enable the position of the clamp housing 322 along the guide rods 330 to be easily adjusted, a lever assembly 336 is provided. The lever assembly 336 comprises a lever arm 338 and a connecting rod 340. The connecting rod 340 is slidably disposed through one of the end plates 332 and has one end rigidly connected to the clamp housing 322 and the other end pivotally connected to a medial portion of the lever arm 338. The lever arm 338 is pivotally attached to the end plate 332 at a first end so that movement of a second or free end results in the movement of the clamp housing 332 along the guide rods 330.

Referring again to FIG. 15, the turntable 262 is provided with a circular saw 342 for cutting the distal portion 210 of the polyethylene pipe adjacent to the first end 202 to produce the second end 212. The saw 342 is pivotally mounted to a base plate 344 which is in turn slidably mounted to a pair of parallel guide rods 346 radially extending from near the hub portion 264 to the outer peripheral portion 266 of the turntable 262 between the first and second clamp assemblies 306, 308. As such, the saw 342 is slidable between a storage position adjacent to the hub portion 264 and a cutting position adjacent to the first and second clamp assemblies 306, 308.

To provide additional support to the turntable 262 in the area of the clamp assemblies 306, 308, a support leg 348 is connected to the turntable 262 between the first and second clamp assemblies 306, 308. The lower end of the support leg 348 is provided with a wheel 350 to allow the support leg 348 to travel along the ground as the turntable 262 is rotated. A handle 352 is radially extended from the turntable 262 to facilitate rotation of the turntable 262.

The forming of the pilot apertures 56 in the sidewall 58 and the pilot apertures 60 in the opposed sidewall 62 of the retainer members is facilitated by providing the turntable 262 with a plurality of drill guides 354. The drill guides 354 are tubular members disposed through and equally spaced along the support rail 278. The drill guides 354 extend radially inward a distance equal to the distance the lower portion 292 of the outer member 288 extends from the support rail 278. The drill guides 354 are spaced from the bottom plate 300 so that the drill guides 354 are perpendicular to the retainer member when the retainer member is positioned in the loop forming groove 208.

To form one of the retainer members with the loop forming table 204, the first end 202 of the polyethylene pipe is withdrawn from the coil and secured to the turntable 262 with the first clamp assembly 306. The turntable 262 of the loop forming table 204 is then rotated in the material feeding direction 206. As the turntable 262 is rotated, the polyethylene pipe is fed into the loop forming groove 208 formed by the lower portions 292, 298 of the outer and inner members 288, 294 of the groove configurations 280. The turntable 262 is rotated in the material feeding direction 206 about 360 degrees thereby resulting in the polyethylene pipe being formed into a circular configuration with the distal portion 210 of the polyethylene pipe overlapping the first end 202 of the polyethylene pipe as illustrated in FIG. 13.

The distal portion 210 of the polyethylene pipe is secured in the second clamp assembly 308 in order to stabilize the distal portion 210 for cutting. Prior to disposing the distal portion 210 in the second clamp assembly 308, the clamp block 324 along with the first and second clamp members 326, 328 are set in the raised position relative to the first clamp assembly 306 to enable the distal portion 210 to overlap the first end 202 of the polyethylene pipe. The clamp block 324 is supported in the raised position with a support rod 356 which is partially inserted through an opening (not shown) in the clamp block 324 such that a portion of the support rod 356 extends from the clamp block 324 so as to supportingly engage one of the guide rods 330 of the clamp support frame 320.

With the distal portion 210 clamped and raised as shown in FIG. 13, the circular saw 342 is pulled outwardly along the guide rods 346 to the cutting position and brought down onto the distal portion 210 of the polyethylene pipe to cut the distal portion 210 substantially adjacent the first end 202 of the polyethylene pipe to produce the second end 212 thereof.

The clamp block 324 is then set in the lowered position by removing the support rod 356, thus substantially aligning the first end 202 and the second end 212 of the polyethylene pipe. To ensure a curvilinear connection between the first and second ends 202, 212 the first and second ends 202, 212 are trimmed with the saw 342 so that the first and second ends 202, 212 are cut at corresponding angles which will form a curvilinear juncture when the first and second ends 202, 212 are brought together and connected.

Once the polyethylene pipe is cut and trimmed, the first and second ends 202, 212 are connected to form a closed loop configuration. As mentioned above, the first and second ends 202, 212 of the polyethylene pipe can be secured together by any suitable means, such as heat welding, collars, nipples, adhesive or the like. However, the preferred means is by heat welding.

To heat weld the first and second ends together, the first and second ends 202, 212 are first heated. As shown in FIG. 16, a conventional two sided heating pad 358 is manually disposed between the first and second ends 202, 212. The first and second ends 202, 212 are then engaged against the heating pad 358 by moving the second end 212 of the polyethylene pipe toward the first end 202 by moving the clamp housing 322 toward the first clamp assembly 306 with the lever assembly 336.

Figure 17:
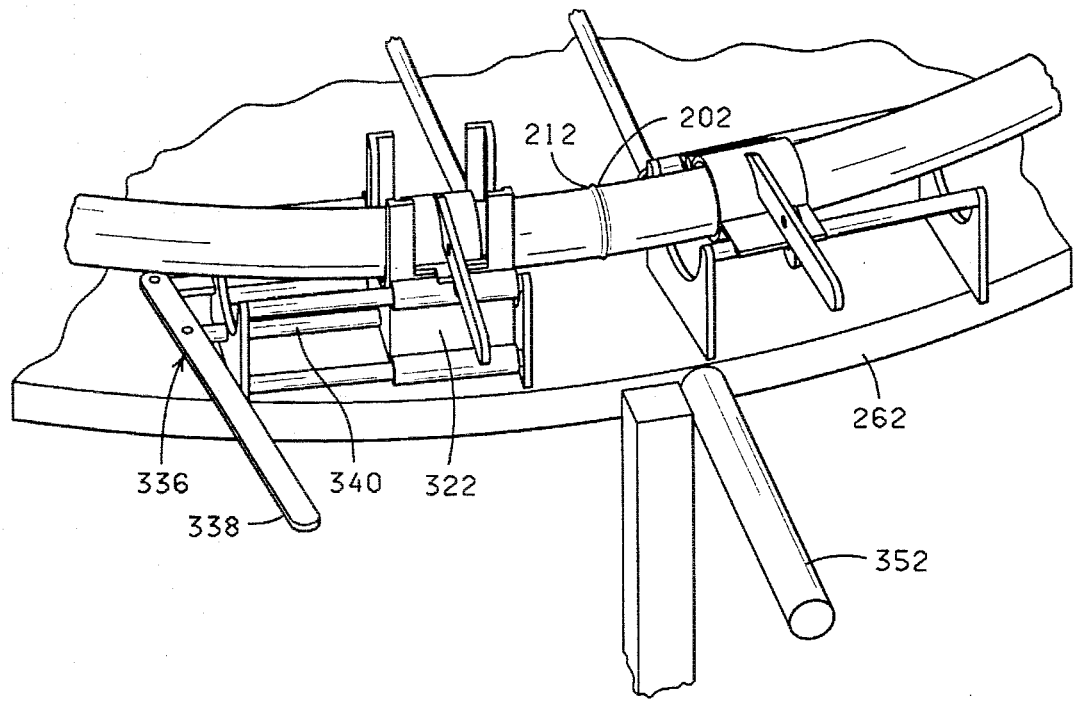
FIG. 17 is a fragmental, perspective view of the loop forming table illustrating the ends of the retainer member being fused together.

Once the first and second ends 202, 212 are sufficiently heated, the heating pad 358 is removed and the first and second ends 202, 212 are brought together in an abutting relationship as illustrated in FIG. 17. With the first and second ends 202, 212 aligned and abutting, a compressive force is applied to the first and second ends 202, 212 via the lever assembly 336. The handle 352 mounted on the turntable 262 near the first clamp assembly 306 permits an opposing force to be applied to prevent the turntable 262 from rotating. The compressive force applied to the first and second ends 202, 212 must be suitable for fusing the first and second ends 202, 212 together. That is, it is important that enough pressure be applied to the first and second ends 202, 212 to cause the heated material to fuse. Conversely, it is also important not to apply to much pressure to the first and second ends 202, 212 otherwise the heated material will be squeezed out and thus prevent a secure bond from being formed.

After the first and second ends 202, 212 are connected, a drilling device, such as a hand drill (not shown) is used to drill the pilot apertures 56 and 60 in the retainer member. The pilot apertures 56 are formed by inserting the drill bit of the hand drill into the drill guides 354 and engaging the drill bit against the outer side wall 58 of the retainer member to drill the pilot aperture 56 into such side wall 58. The pilot aperture 60 formed in the inner or opposing side wall 62 is formed by further extending the drill bit into the drill guide 354 so that the drill bit extends the width of the polyethylene pipe and engages the opposite side wall 62 thereby forming the axially aligned pilot aperture 60 (FIG. 3). After all the pilot apertures 56, 60 are formed in the retainer member, the retainer member is removed from the turntable 262 by opening the first and second clamp assemblies 306, 308 and lifting the retainer member from the loop forming table 204, as illustrated in FIG. 18.

Figure 19:
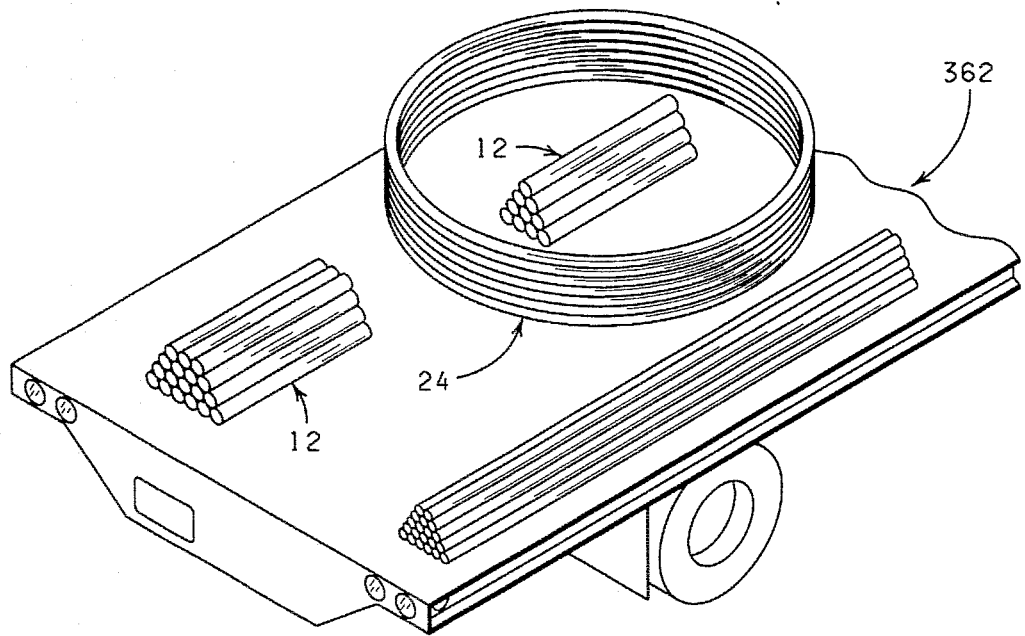
FIG. 19 is a fragmental, perspective view of a trailer depicting various non-assembled elements of the livestock feeder of the present invention positioned thereon.

Another important feature of the livestock feeder 10 is that such feeder is substantially maintenance free, can readily be transported as a kit of parts prior to assembly, once assembled it can be readily disassembled for storage and transportation, and the components of such feeder requires less storage space than prior art livestock feeders. These features are illustrated in FIG. 19 wherein a plurality of leg members and retainer members, such as leg members 12 and retainer members 24 are positioned on a flatbed trailer 362. The unique design of the livestock feeder 10, permits the components of such feeder to lay substantially flat on the bed of the flat bed trailer 362.

FIG. 20 illustrates another embodiment of a trailer 364 for shipping components of the livestock feeder 10. The trailer 364 includes a frame 366 having a first side 368, a second side 370, a front end 372, and a rear end 374. The frame 366 is rollingly supported on a plurality of wheels 376 and adapted to be connected to a vehicle via a goose neck assembly 378.

To efficiently transport a number of retainer members, the trailer is provided with a retainer member retaining rack 380. The retainer member retaining rack 380 is constructed to have a semicircular configuration adapted to receive the retainer members in a vertical orientation as shown in FIG. 20.

In use, the retainer members are stacked in the retainer member retaining rack 380 so as to form a horizontally oriented stack 382 of the retainer members. With the retainer members stacked on the retainer member retaining rack 380, the leg members 12–22 can be disposed and secured within the horizontal stack of the retainer members if desired. Once the retainer members and the leg members are secured on the trailer, the trailer 364 is then transported to a predetermined destination.

From the above description it is clear that the present invention is well adapted to carry out the objects and to attain the advantages mentioned herein as well as those inherent in the invention. While a presently preferred embodiment of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method for manufacturing a livestock feeder for retaining hay so that livestock can consume the hay without trampling on the hay, the method comprising the steps of:

forming a plurality of polymeric retainer members having angular deflection characteristics and memory;

forming a plurality of leg members; and connecting the leg members and the retainer members together such that the leg members and the retainer members cooperate to define a hay retaining space with the retainer members horizontally, spatially disposed to permit access to hay in the hay retaining space by livestock while preventing livestock from trampling hay in the hay retaining space and the leg members spatially disposed to permit the polymeric retainer members to be angularly deflected by pressure exerted thereon and restored to a substantially non-deflected position upon removal of such pressure.

2. The method of claim 1 wherein the retainer members are fabricated of a tubular polyethylene material having a first end and a second end, and wherein the step of forming the retainer members comprises the steps of:

feeding the tubular polyethylene material into a loop forming groove such that the tubular polyethylene material is formed into a substantially looped configuration with the first end substantially adjacent to the second end;

connecting the first end to the second end to form the retainer member such that same has a closed loop configuration; and removing the retainer member from the loop forming groove.

3. The method of claim 2 wherein the connecting step comprises the steps of:

heating the first end and the second end of the tubular polyethylene material;

abutting the first and second ends; and applying a sufficient force to the first and second ends so that the first and second ends fuse together.

4. The method of claim 3 wherein the tubular polyethylene material has an outer diameter of from about 1⅝ inches to about 3 inches and a wall thickness of from about 3/16 inches to about ⅜ inches.

5. The method of claim 2 wherein the loop forming groove is provided on a turntable, and wherein the method further comprises the steps of:

clamping the first end of the tubular polyethylene material to the turntable;

turning the turntable about 360 degrees in a material feeding direction and simultaneously feeding the tubular polyethylene material into the groove provided on the turntable such that the tubular polyethylene material is formed into the looped configuration with the first end positioned adjacent to the second end.

6. The method of claim 5 further comprising the step of:

clamping the second end of the tubular polyethylene material to the turntable near the first end of the tubular polyethylene material.

7. The method of claim 6 wherein the connecting step comprises the steps of:

heating the first end and the second end of the tubular polyethylene material;

abutting the first and second ends; and applying a sufficient force to the first and second ends so that the first and second ends fuse together.

8. The method of claim 7 further comprising the step of:

cutting the first end and the second end at corresponding angles so that the first and second ends of the tubular polyethylene material form a curvilinear juncture when the first and second ends are connected together.

9. The method of claim 8 further comprising the step of:

forming a plurality of spatially disposed pilot apertures through a sidewall of the tubular polyethylene material and a plurality of spatially disposed axially aligned pilot apertures through an opposed sidewall.

10. The method of claim 9 wherein the tubular polyethylene material has an outer diameter of from about 1⅝ inches to about 3 inches and a wall thickness of from about 3/16 inches to about ⅜ inches.

11. The method of claim 1 wherein the retainer members are fabricated of a coil of tubular polyethylene material, and wherein the step of forming the retainer members comprises the steps of:

disposing the coil of tubular polyethylene material on a first turntable;

uncoiling a portion of the tubular polyethylene material from the first turntable, the uncoiled portion of tubular polyethylene material having a first end;

clamping the first end of the tubular polyethylene material to a second turntable;

turning the second turntable about 360 degrees in a material feeding direction and simultaneously feeding the tubular polyethylene material into a loop forming groove provided about the periphery of the second turntable such that the tubular polyethylene material is formed into a looped configuration with a distal portion of the tubular polyethylene material overlapping the first end of the tubular polyethylene material;

cutting the tubular polyethylene material at the distal portion of the tubular polyethylene material substantially adjacent to the first end thereof so as to produce a second end of the tubular polyethylene material;

connecting the first end to the second end to form the retainer member such that same has a closed loop configuration; and removing the retainer member from the second turntable.

12. The method of claim 11 wherein the connecting step comprises the steps of:

heating the first end and the second end of the tubular polyethylene material;

abutting the first and second ends; and applying a sufficient force to the first and second ends so that the first and second ends fuse together.

13. The method of claim 12 wherein the tubular polyethylene material has an outer diameter of from about 1⅝ inches to about 3 inches and a wall thickness of from about 3/16 inches to about ⅜ inches.

14. The method of claim 11 further comprising the step of:

prior to the cutting step, clamping the distal portion of the tubular polyethylene material to the second turntable near the first end of the tubular polyethylene material such that the distal portion is stable for the cutting step.

15. The method of claim 14 further comprising the step of:

subsequent to the cutting step, aligning the first end and the second end of the tubular polyethylene material.

16. The method of claim 15 wherein the cutting step further comprises:

cutting the first end and the second end at corresponding angles so that the first and second ends form a curvilinear juncture when the first and second ends are connected together.

17. The method of claim 16 wherein the connecting step comprises the steps of:

heating the first end and the second end of the tubular polyethylene material;

abutting the first and second ends; and applying a sufficient force to the first and second ends so that the first and second ends fuse together.

18. The method of claim 17 wherein the tubular polyethylene material has an outer diameter of from about 1⅝ inches to about 3 inches and a wall thickness of from about 3⁄16 inches to about ⅜ inches.

19. The method of claim 17 further comprising the step of:
forming a plurality of spatially disposed pilot apertures through a sidewall of the tubular polyethylene material and a plurality of spatially disposed axially aligned pilot apertures through an opposed sidewall.

20. The method of claim 1 wherein the leg members are formed of a tubular polymeric material, and wherein the step of forming the leg members comprises the steps of:
cutting the tubular polymeric material to a predetermined length;
providing each leg member with a plurality of ring retaining slots spatially disposed along a sidewall of the tubular polyethylene material, each of the ring retaining slots adapted to supportively receive one of the retainer members; and
forming a plurality of spatially disposed pilot apertures through an opposing sidewall of the tubular polyethylene material such that one of the pilot apertures is axially aligned with one of the retaining slots.

21. The method of claim 20 wherein the tubular polyethylene material has an outer diameter of from about 3½ inches to about 4½ inches and a wall thickness of at least ⅜ inches.

22. A method of manufacturing a kit of parts for fashioning a livestock feeder for retaining hay so that livestock can consume the hay without trampling on the hay, the method comprising the steps of:
forming a plurality of polymeric retainer members having angular deflection characteristics and memory; and
forming a plurality of leg members connectable to the retainer members such that the leg members and the retainer members cooperate to define a hay retaining space with the retainer members horizontally, spatially disposed to permit access to hay in the hay retaining space by livestock while preventing livestock from trampling hay in the hay retaining space and the leg members spatially disposed to permit the polymeric retainer members to be angularly deflected by pressure exerted thereon and restored to a substantially non-deflected position upon removal of such pressure.

23. The method of claim 22 wherein the retainer members are fabricated of a tubular polyethylene material having a first end and a second end, and wherein the step of forming the retainer members comprises the steps of:
feeding the tubular polyethylene material into a loop forming groove such that the tubular polyethylene material is formed into a substantially looped configuration with the first end substantially adjacent to the second end;
connecting the first end to the second end to form the retainer member such that same has a closed loop configuration; and
removing the retainer member from the loop forming groove.

24. The method of claim 23 wherein the connecting step comprises the steps of:
heating the first end and the second end of the tubular polyethylene material;
abutting the first and second ends; and applying a sufficient force to the first and second ends so that the first and second ends fuse together.

25. The method of claim 24 wherein the tubular polyethylene material has an outer diameter of from about 1⅝ inches to about 3 inches and a wall thickness of from about 3⁄16 inches to about ⅜ inches.

26. The method of claim 23 wherein the loop forming groove is provided on a turntable, and wherein the method further comprises the steps of:
clamping the first end of the tubular polyethylene material to the turntable;
turning the turntable about 360 degrees in a material feeding direction and simultaneously feeding the tubular polyethylene material into the loop forming groove provided on the turntable such that the tubular polyethylene material is formed into the looped configuration with the first end positioned adjacent to the second end.

27. The method of claim 26 further comprising the step of:
clamping the second end of the tubular polyethylene material to the turntable near the first end of the tubular polyethylene material.

28. The method of claim 27 wherein the connecting step comprises the steps of:
heating the first end and the second end of the tubular polyethylene material;
abutting the first and second ends; and
applying a sufficient force to the first and second ends so that the first and second ends fuse together.

29. The method of claim 28 further comprising the step of:
cutting the first end and the second end at corresponding angles so that the first and second ends of the tubular polyethylene material form a curvilinear juncture when the first and second ends are connected together.

30. The method of claim 29 further comprising the step of:
forming a plurality of spatially disposed pilot apertures through a sidewall of the tubular polyethylene material and a plurality of spatially disposed axially aligned pilot apertures through an opposed sidewall.

31. The method of claim 30 wherein the tubular polyethylene material has an outer diameter of from about 1⅝ inches to about 3 inches and a wall thickness of from about 3⁄16 inches to about ⅜ inches.

32. The method of claim 22 wherein the retainer members are fabricated of a coil of tubular polyethylene material, and wherein the step of forming the retainer members comprises the steps of:
disposing the coil of tubular polyethylene material on a first turntable;
uncoiling a portion of the tubular polyethylene material from the first turntable, the uncoiled portion of tubular polyethylene material having a first end;
clamping the first end of the tubular polyethylene material to a second turntable;
turning the second turntable about 360 degrees in a material feeding direction and simultaneously feeding the tubular polyethylene material into a loop forming groove provided about the periphery of the second turntable such that the tubular polyethylene material is formed into a looped configuration with a distal portion of the tubular polyethylene material juxtaposed relative to the first end of the tubular polyethylene material;
cutting the tubular polyethylene material at the distal portion of the tubular polyethylene material substantially adjacent to the first end of the tubular polyethylene material so as to produce a second end of the tubular polyethylene material;

connecting the first end to the second end to form the retainer member such that same has a closed loop configuration; and removing the retainer member from the second turntable.

33. The method of claim 32 wherein the connecting step comprises the steps of:

heating the first end and the second end of the tubular polyethylene material;

abutting the first and second ends; and applying a sufficient force to the first and second ends so that the first and second ends fuse together.

34. The method of claim 33 wherein the tubular polyethylene material has an outer diameter of from about 1⅝ inches to about 3 inches and a wall thickness of from about 3/16 inches to about ⅜ inches.

35. The method of claim 32 further comprising the step of:

prior to the cutting step, clamping the distal portion of the tubular polyethylene material to the second turntable near the first end of the tubular polyethylene material such that the distal portion is stable for the cutting step.

36. The method of claim 35 further comprising the step of:

subsequent to the cutting step, aligning the first end and the second end of the tubular polyethylene material.

37. The method of claim 36 wherein the cutting step further comprises:

cutting the first end and the second end at corresponding angles so that the first and second ends form a curvilinear juncture when the first and second ends are connected together.

38. The method of claim 37 wherein the connecting step comprises the steps of:

heating the first end and the second end of the tubular polyethylene material;

abutting the first and second ends; and applying a sufficient force to the first and second ends so that the first and second ends fuse together.

39. The method of claim 38 wherein the tubular polyethylene material has an outer diameter of from about 1⅝ inches to about 3 inches and a wall thickness of from about 3/16 inches to about ⅜ inches.

40. The method of claim 38 further comprising the step of:

forming a plurality of spatially disposed pilot apertures through a sidewall of the tubular polyethylene material and a plurality of spatially disposed axially aligned pilot apertures through an opposed sidewall.

41. The method of claim 22 wherein the leg members are formed of a tubular polymeric material, and wherein the step of forming the leg members comprises the steps of:

cutting the tubular polymeric material to a predetermined length;

providing each leg member with a plurality of ring retaining slots spatially disposed along a sidewall of the tubular polyethylene material, each of the ring retaining slots adapted to supportingly receive one of the retainer members; and forming a plurality of spatially disposed pilot apertures through an opposing sidewall of the tubular polyethylene material such that one of the pilot apertures is axially aligned with one of the retaining slots.

42. The method of claim 41 wherein the tubular polyethylene material has an outer diameter of from about 3½ inches to about 4½ inches and a wall thickness of at least ⅜ inches.

43. A method of shipping a kit of parts for fashioning a livestock feeder for retaining hay so that livestock can consume the hay without trampling on the hay, the kit of parts including a plurality of polymeric ring shaped retainer members and a plurality of leg members, the method comprising the steps of:

disposing the polymeric ring shaped retainer members in a retainer member retaining rack so as to form a horizontally oriented stack of the retainer members, the retainer member retaining rack having a semicircular configuration adapted to receive the horizontally oriented stack of the retainer members and the retainer member retaining rack supported on a frame rollingly supported by a plurality of wheels and adapted to be connected to a vehicle;

disposing the leg members within the stack of the retainer members; and transporting the frame to a predetermined destination.

* * * * *

UNITED STATES PATENT AND TRADEMARK OFFICE
CERTIFICATE OF CORRECTION

PATENT NO. : 5,554,248
DATED : September 10, 1996
INVENTOR(S) : Joe L. Payne

It is certified that error appears in the above-identified patent and that said Letters Patent is hereby corrected as shown below:

Column 3, line 17, delete "axially".

Column 5, line 50, please delete "116a" and substitute therefor --116c--.

Column 6, line 16, please delete "116b" and substitute therefor --116d--.

Column 6, line 50, please delete "regulating member 156" and substitute therefor --regulating member 158--.

Column 7, lines 10-11, please delete "leg engagement member 158" and substitute therefor --leg engagement member 156--.

Column 7, line 15, please delete "leg retaining slot 14" and substitute therefor --leg retaining slot 114--.

Column 7, line 43, please delete "48-52" and substitute therefor --48-54--.

Column 8, line 15, please delete "48-52" and substitute therefor --48-54--.

Column 8, line 20, please delete "48-52" and substitute therefor --48-54--.

Column 8, line 22, please delete "48-52" and substitute therefor --48-54--.

UNITED STATES PATENT AND TRADEMARK OFFICE
CERTIFICATE OF CORRECTION

PATENT NO. : 5,554,248
DATED : September 10, 1996
INVENTOR(S) : Joe L. Payne

It is certified that error appears in the above-identified patent and that said Letters Patent is hereby corrected as shown below:

Column 9, line 40, after "typically" please insert --will--.

Column 10, line 63, please delete "support member 300" and substitute therefor --support plate 300--.

Column 11, line 8, please delete "retainer members 292, 298" and substitute therefor --retainer members 288, 294--.

Column 11, line 21, please delete "an" and substitute therefor --as--.

Column 11, line 35, please delete "distal end 210" and substitute therefor --distal portion 210--.

Column 11, line 47, please delete "loop forming assembly 276" and substitute therefor --groove forming assembly 276--.

Column 12, line 12, please delete "clamp housing 22" and substitute therefor --clamp housing 322--.

Column 12, line 23, please delete "clamp housing 332" and substitute therefor --clamp housing 322--.

Column 13, line 64, please delete "apply to much" and substitute therefor --apply too much--.

Column 14, line 26 after "feeder 10" please delete ",".

UNITED STATES PATENT AND TRADEMARK OFFICE
CERTIFICATE OF CORRECTION

PATENT NO. : 5,554,248
DATED : September 10, 1996
INVENTOR(S) : Joe L. Payne

It is certified that error appears in the above-identified patent and that said Letters Patent is hereby corrected as shown below:

Column 14, line 26 after "feeder 10" please delete ",".

Signed and Sealed this

Second Day of December, 1997

Attest:

BRUCE LEHMAN

Attesting Officer

Commissioner of Patents and Trademarks